(12) United States Patent
Toda et al.

(10) Patent No.: US 6,476,924 B1
(45) Date of Patent: *Nov. 5, 2002

(54) IMAGE PROCESSING APPARATUS AND METHOD FOR EQUALIZING IMAGES OUTPUTTED BY DIFFERENT DEVICES

(76) Inventors: Yukari Toda, c/o Canon Kabushiki Kaisha, 30-2, Shimomaruko 3-chome, Ohta-ku, Tokyo (JP); Susumu Sugiura, c/o Canon Kabushiki Kaisha, 30-2, Shimomaruko 3-chome, Ohta-ku, Tokyo (JP); Kazuhiro Saito, c/o Canon Kabushiki Kaisha, 30-2, Shimomaruko 3-chome, Ohta-ku, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/522,456

(22) Filed: Aug. 31, 1995

(30) Foreign Application Priority Data

Aug. 31, 1994 (JP) .............................................. 6-207488
Nov. 30, 1994 (JP) .............................................. 6-296992

(51) Int. Cl.[7] .............................................. G06F 15/00
(52) U.S. Cl. ...................................... 358/1.13; 358/1.2
(58) Field of Search ................................ 395/101, 102, 395/109, 111, 112, 114, 117, 131, 331, 335, 570, 800; 382/162, 167, 164; 358/518, 448, 504; 345/1, 132, 150, 153, 154, 155; 399/28, 112, 184; 400/61

(56) References Cited

U.S. PATENT DOCUMENTS

| | | | | |
|---|---|---|---|---|
| 4,603,385 A | * | 7/1986 | Mueller et al. | 395/500 |
| 5,081,529 A | * | 1/1992 | Collette | 358/504 |
| 5,179,652 A | * | 1/1993 | Rozmanith et al. | 395/331 |
| 5,212,770 A | * | 5/1993 | Smith et al. | 395/335 |
| 5,220,674 A | * | 6/1993 | Morgan et al. | 395/800 |
| 5,428,465 A | * | 6/1995 | Kahamori et al. | 358/518 |
| 5,467,434 A | * | 11/1995 | Hower Jr. et al. | 395/114 |
| 5,580,177 A | * | 12/1996 | Gase et al. | 400/61 |
| 5,588,050 A | * | 12/1996 | Kagawa et al. | 382/167 |
| 5,610,997 A | | 3/1997 | Ohta et al. | 382/218 |
| 5,642,474 A | * | 6/1997 | Parkhurst et al. | 395/117 |
| 5,694,227 A | * | 12/1997 | Starweather | 358/504 |
| 5,923,446 A | * | 7/1999 | Navagiri | 358/520 |
| 5,949,427 A | * | 9/1999 | Nishikawa et al. | 345/431 |

* cited by examiner

*Primary Examiner*—Gabriel Garcia
(74) *Attorney, Agent, or Firm*—Fitzpatrick, Cella, Harper & Scinto

(57) ABSTRACT

It is an object of the present invention to output a color-designated character code or line drawing to a visual image output device by efficiently and rapidly converting the character code or line drawing into color space data which depends on the visual image output device. To achieve this object, a code based on PDL is transmitted when document image data formed by, e.g., desk top publishing is output to a visual image output device such as a color printer. If the received code is a character or a graphic, R, G, and B color codes contained in the code are converted into Y, M, and C data. All significant bits of data, having one bit per dot, generated on the basis of the character code, are converted by the Y, M, and C data at once.

8 Claims, 24 Drawing Sheets

FIG. 9

R, G, AND B DC COMPONENTS:

$\begin{pmatrix} 30 \\ 10 \\ 20 \end{pmatrix} \rightarrow \begin{pmatrix} 30 \\ 10 \\ 20 \end{pmatrix} \rightarrow \begin{pmatrix} 30 \\ 10 \\ 20 \end{pmatrix} \rightarrow \begin{pmatrix} 30 \\ 10 \\ 20 \end{pmatrix} \rightarrow \begin{pmatrix} 2 \\ 3 \\ 5 \end{pmatrix} \rightarrow \begin{pmatrix} 30 \\ 10 \\ 20 \end{pmatrix} \rightarrow \begin{pmatrix} 30 \\ 10 \\ 20 \end{pmatrix} \rightarrow \begin{pmatrix} 30 \\ 10 \\ 20 \end{pmatrix} \rightarrow \begin{pmatrix} 2 \\ 3 \\ 5 \end{pmatrix} \rightarrow \begin{pmatrix} 2 \\ 3 \\ 5 \end{pmatrix}$

R, G, AND B DIFFERENTIAL DC COMPONENTS:

$\begin{pmatrix} 30 \\ 10 \\ 20 \end{pmatrix} \rightarrow \begin{pmatrix} 0 \\ 0 \\ 0 \end{pmatrix} \rightarrow \begin{pmatrix} 0 \\ 0 \\ 0 \end{pmatrix} \rightarrow \begin{pmatrix} 0 \\ 0 \\ 0 \end{pmatrix} \rightarrow \begin{pmatrix} -28 \\ -7 \\ -15 \end{pmatrix} \rightarrow \begin{pmatrix} 28 \\ 7 \\ 15 \end{pmatrix} \rightarrow \begin{pmatrix} 0 \\ 0 \\ 0 \end{pmatrix} \rightarrow \begin{pmatrix} 0 \\ 0 \\ 0 \end{pmatrix} \rightarrow \begin{pmatrix} -28 \\ -7 \\ -15 \end{pmatrix} \rightarrow \begin{pmatrix} 0 \\ 0 \\ 0 \end{pmatrix}$

IMAGE PROCESSING APPARATUS AND METHOD FOR EQUALIZING IMAGES OUTPUTTED BY DIFFERENT DEVICES

BACKGROUND OF THE INVENTION

The present invention relates to an image processing apparatus and method and, more particularly, to an image processing apparatus and method for outputting input document image data to a visual image output device.

As illustrated in FIG. 13, document image data formed by DTP (Desk Top Publishing) is described in a certain kind of a PDL and converted into rasters. The raster image data is subjected to color processing by which the data is matched with the color characteristics of an output printer or an output monitor, i.e., the data is subjected to processing based on a CMM (Color Matching Method). The color-matched data is then transferred to an output unit and either printed or displayed on a monitor. In this conventional method, the color matching processing is done for all pixels by performing a color processing calculation for the raster image data in units of pixels.

Unfortunately, the above conventional method needs a long processing time for the color matching. Additionally, since the color processing calculation is done for all the pixels of the raster image data, an extremely long processing time is necessary.

Also, the color characteristics of the output printer or the output monitor differ from one apparatus to another. Therefore, when a plurality of output printers or output monitors are connected to a single host computer through a network, it is uncertain with which color characteristics the color matching is to be performed.

On the other hand, images (to be referred to as "CG images" hereinafter) formed by computers are beginning to be expressed using more colors and more gray levels. The information amount of such a multi-color image reaches about 46 Mbyte in the case of an A4-size, 400-dpi, 256-gray-level, three-color image. Therefore, such an image needs to be compressed before being stored or transmitted. In decompressing the thus compressed image and outputting the decompressed image to a device such as a printer or a display, it is necessary to perform color conversion or γ conversion suitable for the output device. FIG. 14 is a view for explaining the case where compressed data is decompressed and output to a color printer.

In FIG. 14, input compressed data is converted into 8-bit R, G, and B pixel data by a decompressor 901 which includes a code analyzer 901A and a pixel data generator 901B. These 8-bit R, G, and B pixel data are converted into 8-bit C, M, Y, and K image data by color matching performed by a color processor 902 and transferred to a color printer 903. FIG. 15 is a view for explaining the processing of this color processor 902.

In FIG. 15, a LOG conversion block denoted by 2011 performs conversion from the RGB color space to the YMC color space in accordance with the following expression:

$$Y = -\log B$$
$$M = -\log G \quad (1)$$
$$C = -\log R$$

Subsequently, a masking block denoted by 2012 performs masking for the Y, M, and C signals, by which the signals are matched with the unique color characteristics of a printer, in accordance with the following expression:

$$\begin{bmatrix} Y' \\ M' \\ C' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Y \\ M \\ C \end{bmatrix} \quad (2)$$

In addition, a black generation block denoted by 2013 subtracts the minimum value of the Y', M', and C' signals, i.e., subtracts a value min(Y',M',C') from the Y', M', and C' signals, and replaces the subtrahend with a K" signal. This is illustrated in FIG. 16.

In this manner, the decompressed pixel data is converted pixel by pixel by using, e.g., a color conversion matrix.

It is unfortunate that the conventional method described above has the following problems.

That is, in the above conventional technique it is necessary to perform the color processing calculation for all pixel data of a decompressed image, resulting in an enormous processing time. To shorten the processing time, on the other hand, hardware capable of high-speed calculations is necessary. This raises the apparatus cost.

SUMMARY OF THE INVENTION

It is an object of the present invention to eliminate the drawbacks of the above conventional method.

That is, it is an object of the present invention to provide an image processing apparatus and method capable of outputting image information, such as a character code or a line drawing whose color is designated, to a visual image output device by efficiently and rapidly converting the image information into data which depends on the visual image output device. Also, the present invention performs color matching between a plurality of output devices during the processing.

To achieve the above object, the present invention discloses an image processing apparatus comprising supplying means for supplying image information described in a predetermined language, developing means for developing the image information into image data for each pixel, and outputting means for outputting the image data to a first output device, wherein the developing means uses a parameter which is determined based on a characteristic of the first output device and a characteristic of a second output device for developing the image information.

It is another object of the present invention to provide an image processing apparatus and method capable of efficiently and rapidly converting coded image data in units of predetermined pixel blocks into data which depends on a visual image output device.

To achieve the above object, the present invention discloses an image processing apparatus comprising supplying means for supplying image information described in a predetermined language, developing means for developing the image information into image data for each pixel, and outputting means for outputting the image data to a predetermined output device, wherein the developing means uses a parameter which is determined based on a characteristic of the predetermined output device received from the predetermined output device.

It is still another object of the present invention to provide an image processing apparatus and method capable of generating data, which depends on a visual image output device, from color images having essentially the same tone of color, without essentially performing processing for converting into the data depending on the output device.

It is still another object of the present invention to provide an image processing apparatus and method capable of reducing processing for decompressing a compressed image and outputting the decompressed image to an output device.

It is still another object of the present invention to provide an image processing apparatus and method which use a plurality of devices connected to a network and hence have a high efficiency.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a view showing the transitions of R, G, and B DC components and R, G, and B differential DC components in the image of FIG. 7;

FIG. 19 is a view showing an example of compressed data;

DETAILED DESCRIPTION OF THE PREFERRED EMBODIMENTS

Preferred embodiments of the present invention will be described in detail below with reference to the accompanying drawings.

First Embodiment

Figure 1:
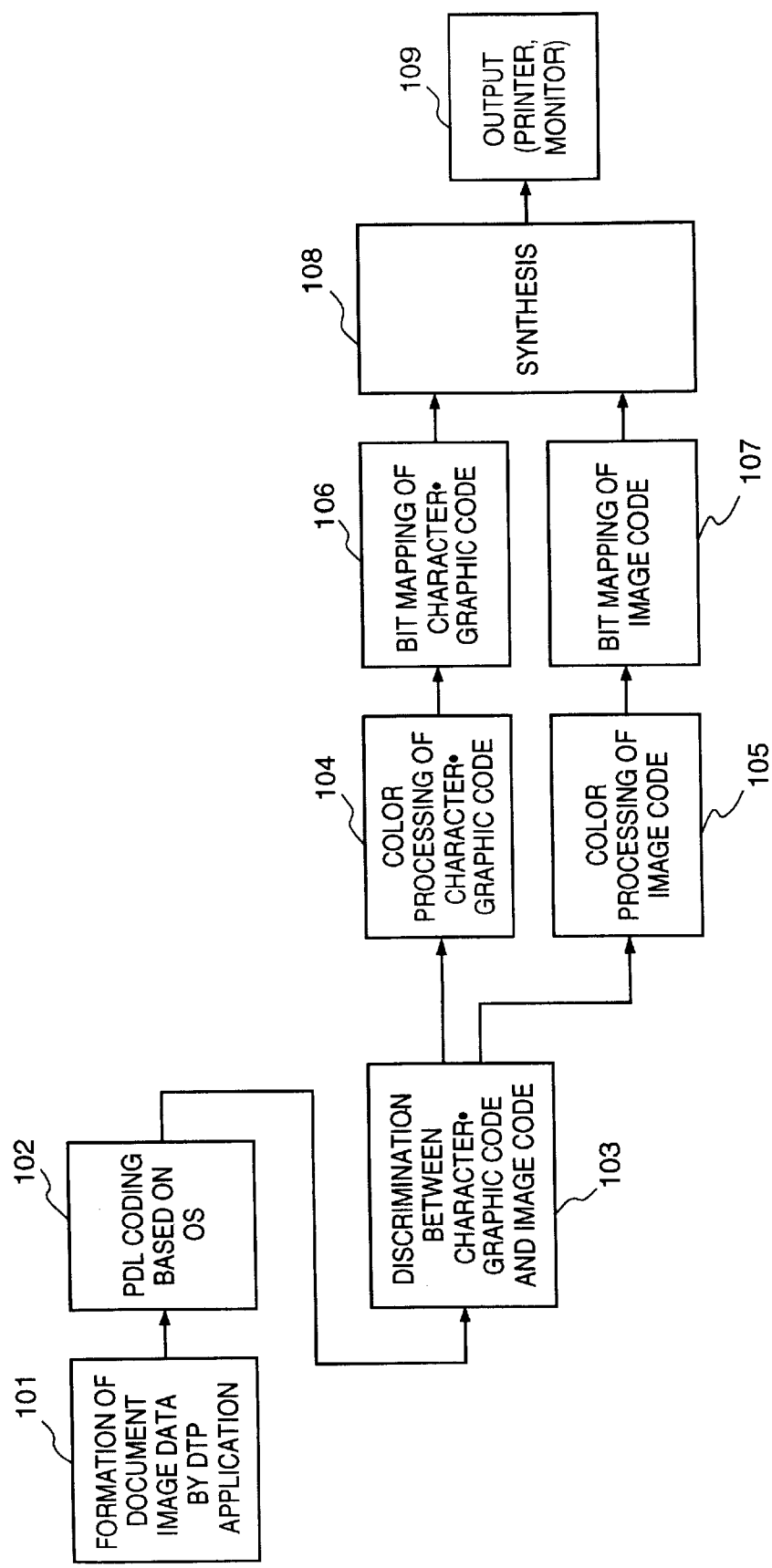
FIG. 1 is a block diagram showing the flow of data in the first embodiment.

FIG. 1 shows both the flow of data in this embodiment of the present invention and the configuration of an apparatus of the embodiment, although detailed names of individual parts are not written. FIG. 1 will be described below.

A unit 101 forms document image data by using DTP application software on a computer. A unit 102 converts the formed document image data into a PDL code on the basis of an OS. A unit 103 discriminates between a character • graphic code and an image code. The character • graphic code and the image code are separately processed. A unit 104 performs character • graphic code color processing for the character • graphic code. A unit 106 forms a bit map by using the color-processed pixel data. On the other hand, a unit 105 performs image code color processing for the image code, and a unit 107 forms a bit map by using the color-processed data. A unit 108 synthesizes the separately color-processed, bit-mapped character • graphic code and image code. A unit 109 prints out the synthetic image or displays it on a monitor.

In the above processing, the data displayed on a monitor is of RGB format, and the output data to a printer is of YMC format (or a format added with a Bk component). Therefore, the contents of the color processing by the units 106 and 107 are altered in accordance with the type of output device.

Figure 2:
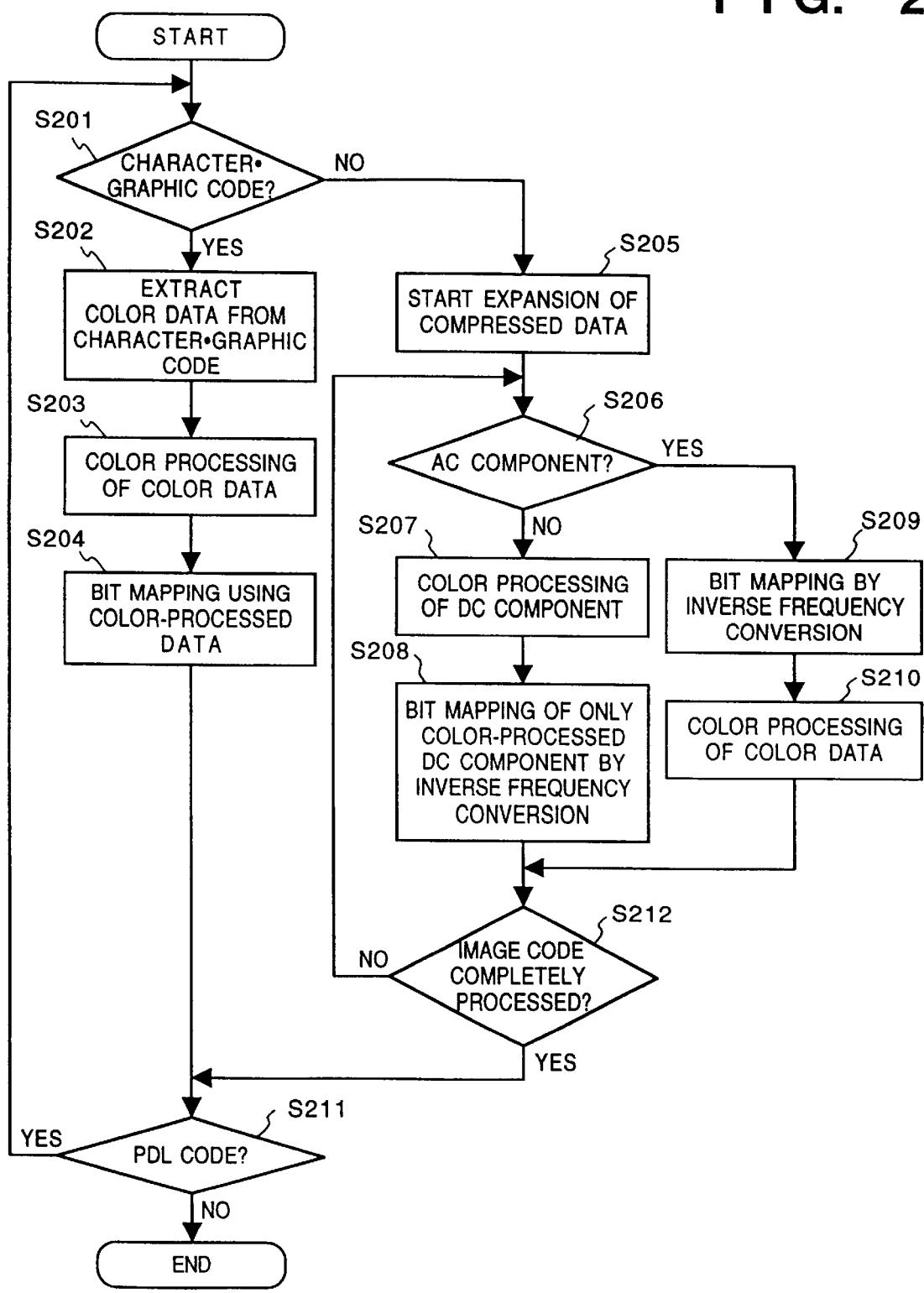
FIG. 2 is a flow chart showing the procedure in the first embodiment.

FIG. 2 is a flow chart best illustrating the characteristic feature of the present invention. That is, FIG. 2 shows the processing pertaining to the present invention from color processing of a PDL code to bit mapping. Assume that an image code is obtained by coding image data, such as a natural image, by using a compression scheme including frequency conversion. This flow chart shows the processing relating to frequency conversion of the present invention, and other processing is omitted. Color processing for a character • graphic code and that for an image code will be separately described in detail later.

The characteristic feature of the present invention will be described below with reference to FIG. 2. In step S201, whether an input PDL code is a character • graphic code or an image code is determined. This determination is accomplished by identifying the header command. That is, if the PDL code is an image code, a command of a predetermined format is added to at least the header of the code, so this command is identified. A character • graphic code is identified by analyzing the code. If the input PDL code is a character • graphic code, color information is extracted from the code (or a command) in step S202. In step S203, color processing is performed using a color processing parameter corresponding to an output device. In step S204, bit mapping (development into image data for each pixel) is performed by using the color-processed data. In step S211, whether another PDL code is present is checked. If YES in step S211, the flow returns to step S201. If NO in step S211, the processing is ended.

In the conventional method described previously, color processing is performed after a PDL code is bit-mapped. Consequently, the color processing must be performed for all the pixels of the bit-mapped data, and a very long time is required for the calculations. In this embodiment, however, the color processing is done before the color information of a PDL code is bit-mapped, so the color processing needs to be performed only once for an object of the same color. This greatly shortens the color processing time.

If the input PDL code is an image code, NO is determined in step S201, and the flow advances to step S205. In step S205, the compressed data is decompressed. Generally, the compressed data is processed in units of n×n (or n×m) blocks in accordance with a compression scheme including frequency conversion. In step S206, whether each unit block converted into the frequency space contains an AC component is checked. If the unit block contains an AC component, the flow advances to step S209 for performing conventional processing. In step S209, the data is inversely frequency-converted and bit-mapped. In step S210, all color data thus bit-mapped is color-converted in accordance with the output device.

If it is determined in step S206 that the unit block does not contain any AC component, in step S207 color processing is performed by using only a DC component of that unit block in accordance with the output device. In step S208, the color-processed DC component alone is inversely frequency-converted and bit-mapped. In step S212, whether this image code is completely processed is checked. If YES in step S212, the flow advances to step S211. If NO in step S212, the processing activities from steps S206 to S210 are repeated.

In the conventional method, after inverse frequency conversion and bit mapping are unconditionally performed, color processing is done in accordance with the color characteristics of an output device. Consequently, calculations must be performed for all pixels. However, using the fact that the background or the like part of a natural image does not contain many AC components but has many regions containing DC components alone, the present invention performs color conversion only for a DC component. This greatly reduces the calculation time for the color processing.

The characteristic feature of this embodiment has been described above. Practical examples of the color processing for each of a character code, a graphic code, and an image code will be described below.

(1) Method of Efficiently Performing Color Matching from Character Code Data

For the sake of simplicity of explanation, assume that pink characters "TOKYO" and a pale blue circle are written on a sheet of paper.

Figure 3:
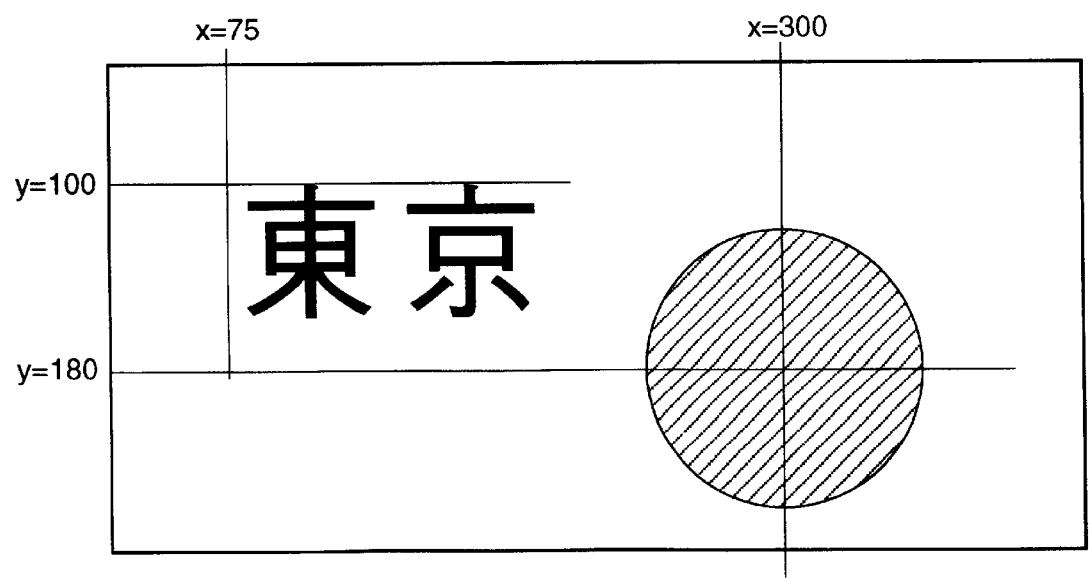
FIG. 3 is a view showing an example of an image including characters and a graphic pattern in the first embodiment.

FIG. 3 shows this example. Assuming a PDL code of a certain kind for characters is represented by ESC[001=moji,xadr,yadr,Rdata,Gdata,Bdata,size, font,char]

ESC[002=circle,xadr,yadr,Rdata,Gdata,Bdata, radius]

Note that ESC is an escape code (1Bh in hexadecimal notation), "moji" is character data, "circle" is a command for drawing a circle, and "xadr" and "yadr" represent the character start position information or circle central position information. Rdata, Gdata, and Bdata indicate the color data information of a character or a circle. "size" indicates the size of a character, and "font" indicates a character font. "char" indicates a described character data string. "radius" indicates the radius of a circle.

In FIG. 3, therefore, the PDL data is expressed by

ESC[001,0100,0075,250,010,025,030,001,TOKYO]

ESC[002,0180,0300,010,020,0250,030]

Note that although a practical PDL has a more complicated form, in this embodiment a PDL is simplified into a form by which the idea of the present invention can be understood. Commonly, image expression data in a PDL is described in a device independent form. In this embodiment, assume that NTSC-RGB is used as this device independent color expression form. Assuming also that the output device is a color printer, the YMC (Yellow,Magenta,Cyan) color space is employed because the color printer performs a subtractive mixing process. Accordingly, it is necessary to perform NTSC-RGB→YMC color space conversion.

Figure 4:
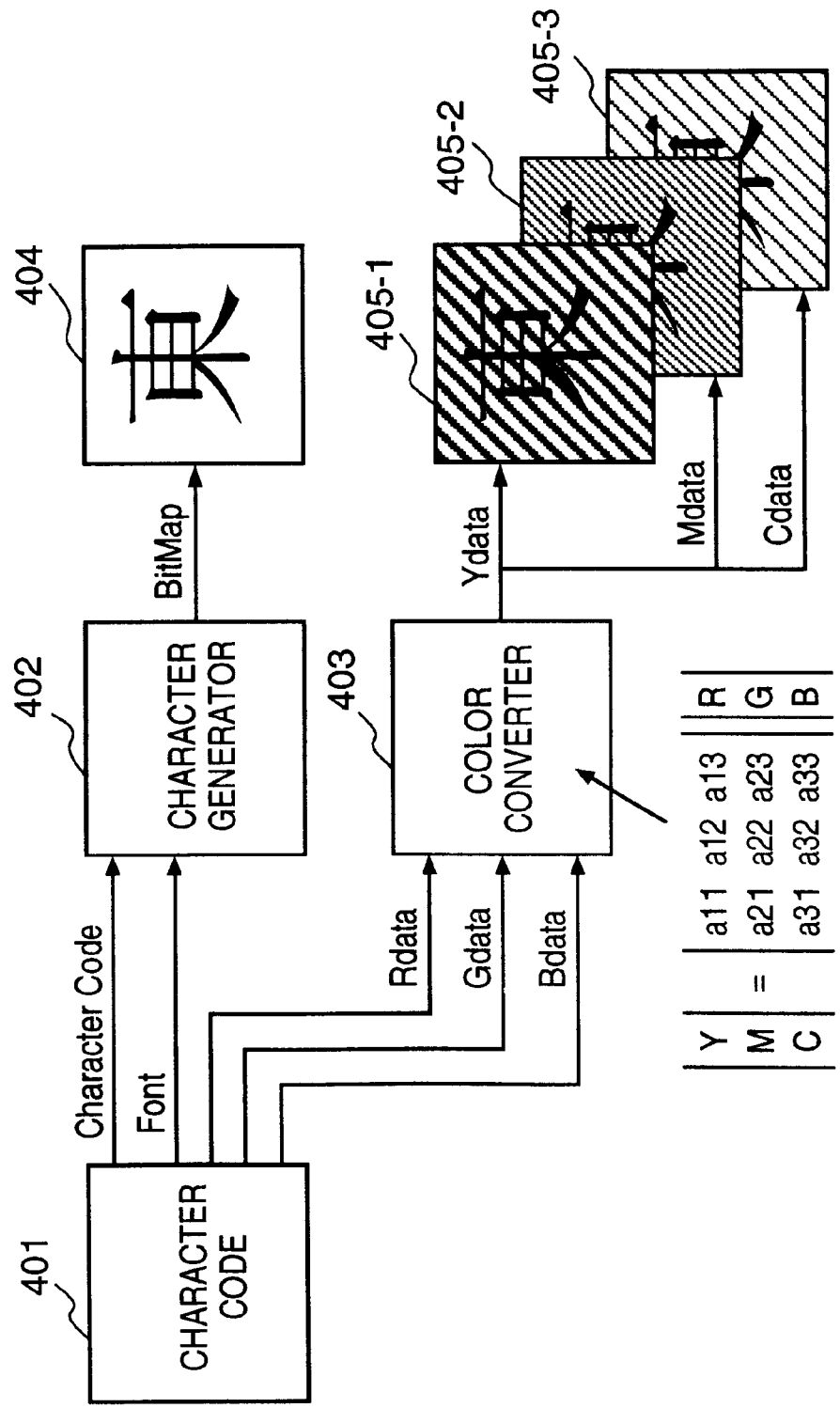
FIG. 4 is a view showing the principle of bit map development and color processing for a character code in the first embodiment.

Referring to FIG. 4, reference numeral 401 denotes a data memory which stores a character code of the PDL; 402, a character generator for converting the character code into bit-map data; and 403, a color converter for extracting and outputting PDL character data Rdata, Gdata, and Bdata. Conversion coefficients a11 to a33 are used to perform conversion from the standard NTSC-RGB color space to the YMC color space of the output color printer. Reference numeral 404 denotes a unit for storing the monochromatic bit-map data converted from the character code data by the character generator 402. A unit 405 colors the data which is bit-mapped by the unit 404. The Y, M, and C data generated by the color converter 403 are used as coloring data.

Reference numerals 405-1, 405-2, and 405-3 denote Y-, M-, and C-component storage areas, respectively. In this case the R, G, and B data values are R=250, G=10, and B=25.

As an example, the character pattern generated by the character generator 402 is assigned data having one bit per pixel; that is, a significant dot (bit) is "1", and an insignificant dot is "0". Therefore, for this significant dot "1" the values of Y, M, and C data (e.g., eight bits for each color component) obtained by the determinant, FIG. 4, are stored in the respective color component data storage areas. For the insignificant dot "0", data of individual color components of the background color (which is designated by a bed control code) are stored. The above processing is unconditionally performed for at least one character pattern without performing the matrix calculation in FIG. 4.

As is apparent from the above explanation, the color processing for the characters "TO" needs to be performed only once. In the conventional method, if one character is displayed by 25×25 dots it is necessary to repeat the color processing calculation 625 times. In the above embodiment, therefore, the repetition number is reduced to 1/625 that in the conventional method. Therefore, it is readily possible to understand how the processing speed is improved.

(2) Method of Efficiently Performing Color Matching from Graphic Code Data

Figure 5:
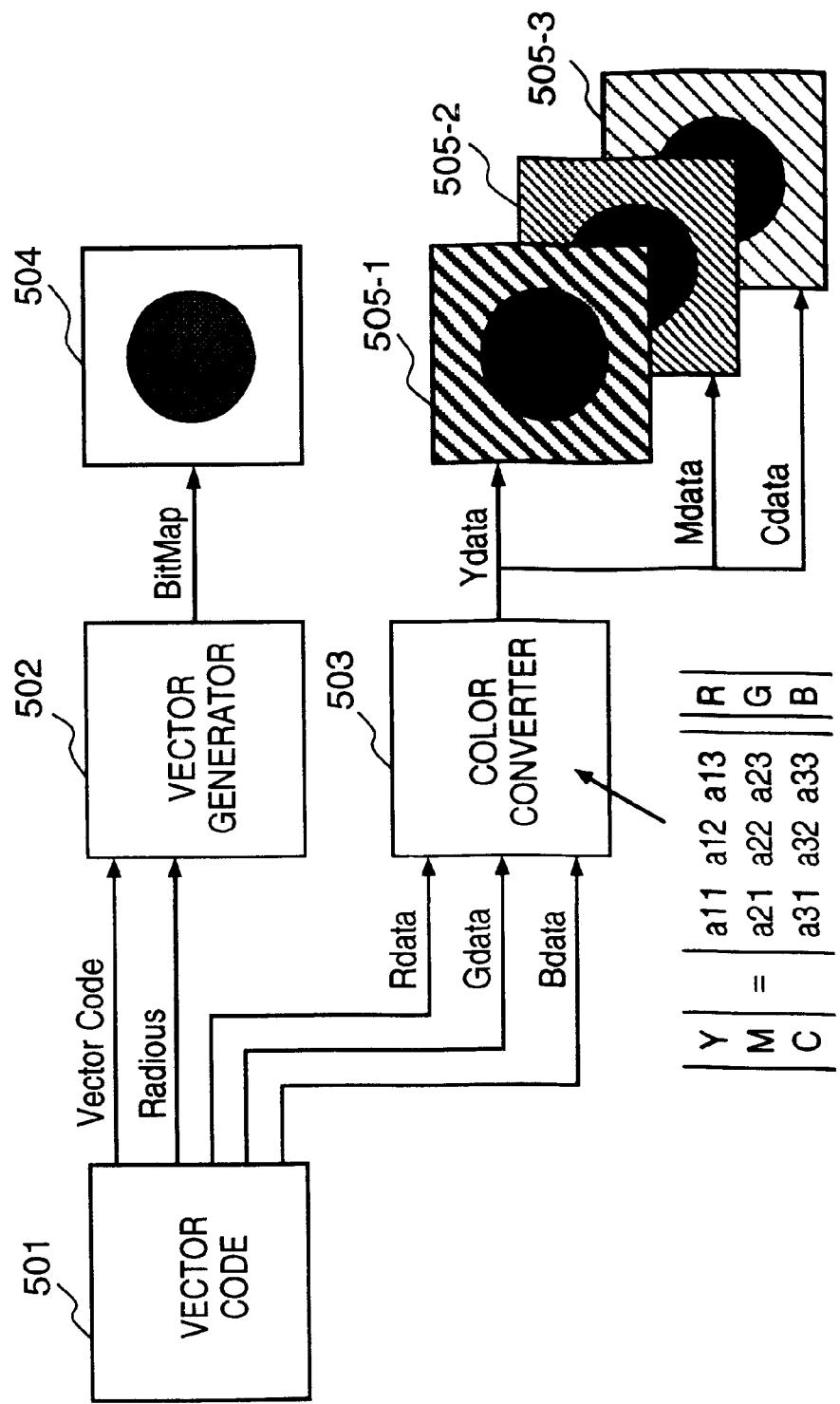
FIG. 5 is a view showing the principle of bit map development and color processing for a graphic code in the first embodiment.

FIG. 5 is a view for explaining drawing of a circular image. A unit 501 stores vector data. In this case the unit 501 stores a command for drawing a circle. A command of a circle (its central coordinate data) and radius data are transferred as vector data for drawing a circle to a vector generator 502 where the data is bit-mapped. As in the case of development of character data, the data is stored in a unit 504 as 1-bit data. On the other hand, data indicating the color information of a vector is transferred to a color converter 503 where the data is color-converted. In this example R=10, G=20, B=250, and the radius is 30. Accordingly, as in the case of the character part, a unit 505 stores Y, M, and C data, subjected to the color processing calculation done by the color converter 503, and the information from the unit 504. Therefore, the color processing calculation need only be performed once. In contrast, in the conventional method the color processing calculation needs to be performed as many as 4069 times, if the data is expressed by 64×64 dots.

(3) Method of Efficiently Performing Color Matching from Image Code

An image code is a group of codes obtained by compressing a raw image such as a natural image. Prior to explaining a method of efficiently performing color matching by decompressing the image code, the compression processing will be briefly described below. This will allow better understanding of the description of the embodiment of the present invention.

Figure 6:
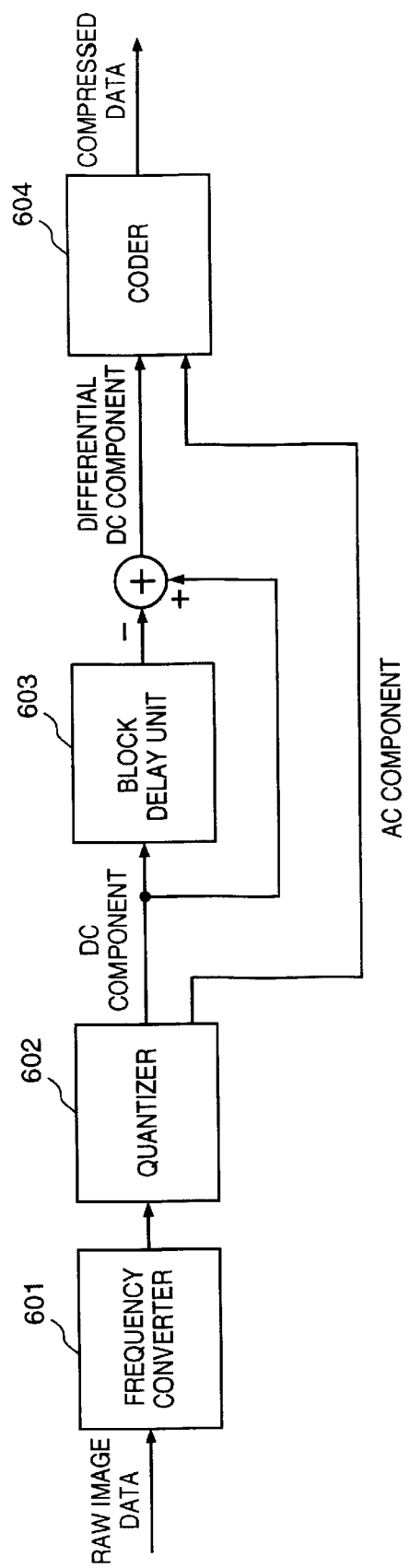
FIG. 6 is a block diagram showing the arrangement of raw image data compression coding in the first embodiment.

FIG. 6 is a block diagram schematically illustrating the compression processing including frequency conversion. A frequency converter 601 converts raw image data into a frequency space in units of blocks of (n×n) pixel blocks by using orthogonal transformation such as DCT transformation. The converted value is called a frequency conversion coefficient. A quantizer 602 similarly performs quantization in units of n×n blocks, and the quantized value is called a quantization coefficient. The quantization coefficient consists of one DC component and (n×n−1) AC components. The DC component is delayed by a block delay unit 603, and the difference from the block before being delayed is coded by a coder 604. The AC components are coded by the coder 604 by performing so-called zigzag scan for the components.

Figure 7:
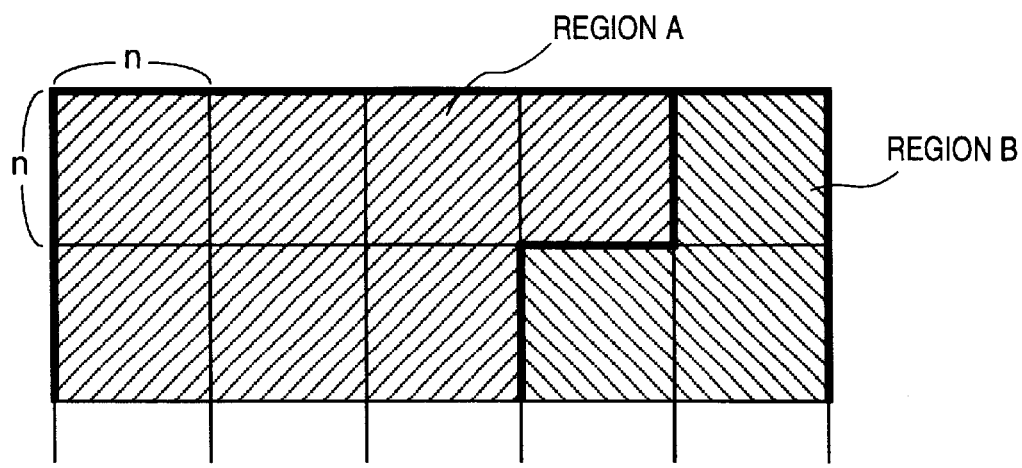
FIG. 7 is a view showing the state of an image in the boundary between different colors.
Figure 8:
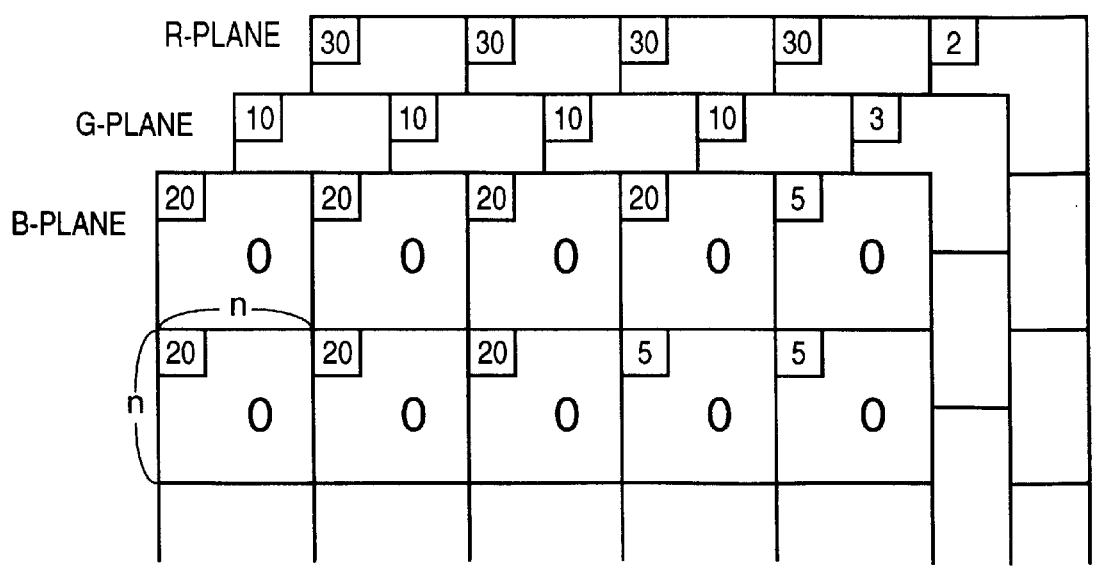
FIG. 8 is a view showing values obtained by frequency-converting and quantizing the image data in FIG. 7.

Conversion of the image data will be described below by using practical examples illustrated in FIGS. 7 to 9. FIG. 7 shows the image data consisting of blocks each having (n×n) pixels. A region A indicated by oblique lines down to the left entirely has a color of a value A. A region B indicating by oblique lines down to the right entirely has a color of a value B. Since the regions A and B are divided by the boundary lines between blocks of n×n pixels, no AC component is generated up to the first 2n lines. FIG. 8 shows data obtained by frequency-converting and quantizing the data in FIG. 7. Referring to FIG. 8, NTSC-RGB is used as the expression form of raw image data, and the quantization coefficients of R-, G-, and B-Planes are illustrated. In the (n×n)-pixel block at the upper left of the front plane (B-Plane), "20" in the upper left corner indicates a DC component, and "0" shows that all other AC components are 0. The upper half of FIG. 9 indicates the transition of the R, G, and B DC components, and the lower half of FIG. 9 indicates the transition of the R, G, and B DC differential components.

Figure 10:
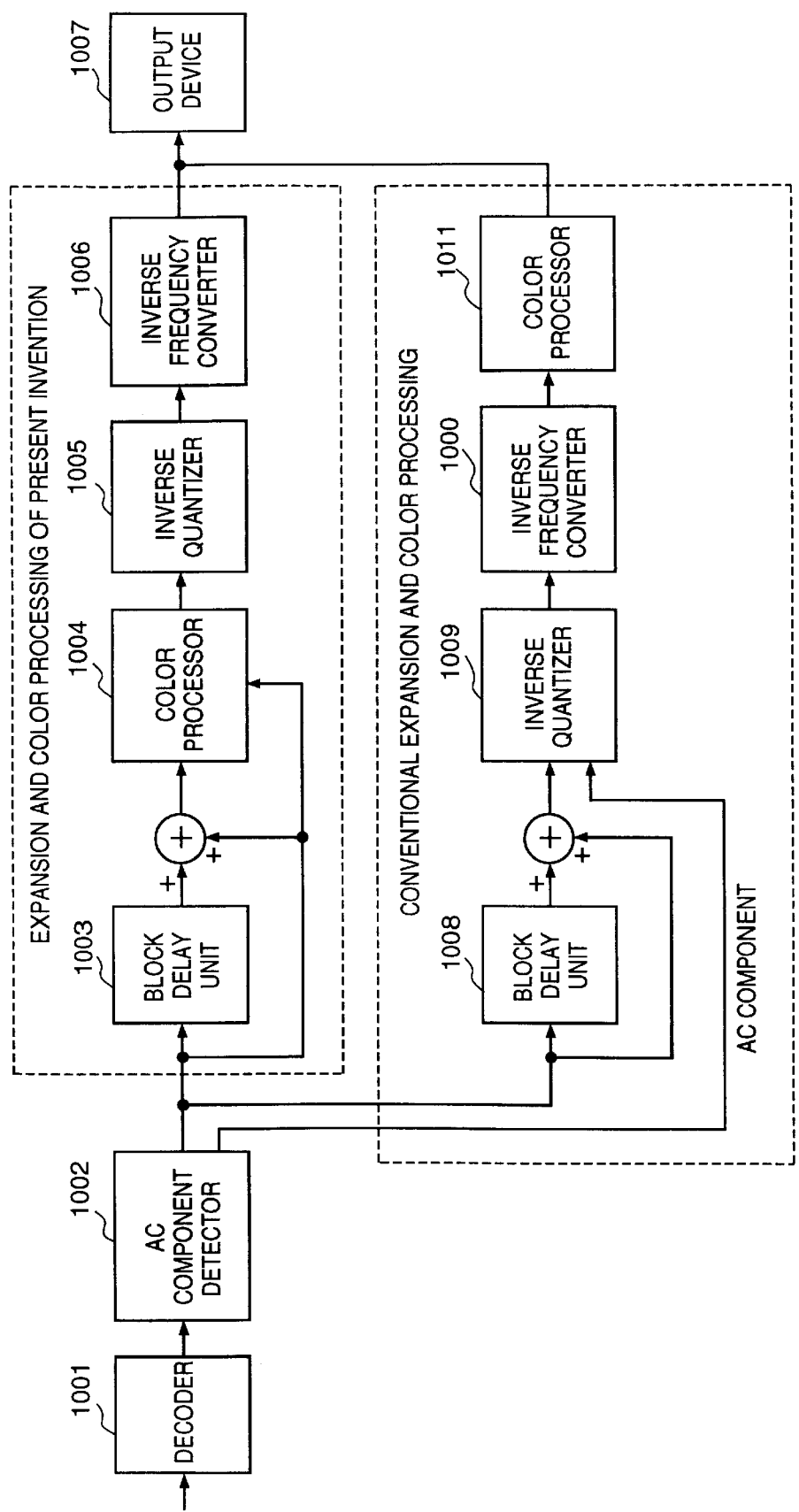
FIG. 10 is a block diagram of an apparatus for performing expansion and color processing for an image code in the first embodiment.

A method of this embodiment for effectively performing color matching in accordance with the color characteristics of an output device while decompressing the coded compressed data will be described below with reference to FIG. 10.

A decoder 1001 decodes the compressed image code and transfers the quantization coefficients in units of blocks of n×n pixels to an AC component detector 1002. If AC components are contained, conventional expansion color processing is performed. If no AC components are contained (if the values of AC components are all "0"), expansion color processing of this embodiment of the present invention is performed. That is, if AC components are contained, the corresponding DC component is differential data with the immediately preceding block. Therefore, a block delay unit 1003 adds the value of the immediately preceding block to the DC component, and the sum is inversely quantized by an inverse quantizer 1009. The AC components are directly, inversely quantized by the inverse quantizer 1009. An inverse frequency converter 1006 converts the reciprocal numbers of the inversely quantized coefficients into numerical components. A color processor 1011 performs color processing for all pixels in accordance with the color characteristics of an output device 1007.

On the other hand, if no AC components are contained, the block delay unit 1003 adds the value of the immediately preceding block to the differential DC component, and this sum alone is transferred to the color processor. A color processor 1004 performs color processing for this DC component in accordance with the characteristics of the output device. If the differential DC component from the AC component detector 1002 is 0, the sum of the DC components equals the value of the immediately preceding block. Accordingly, the color processor 1004 uses this value of the immediately preceding block without performing any color matching calculation. This realizes more efficient color processing. The data thus color-processed is output to the output device via an inverse quantizer 1005 and an inverse frequency converter 1006.

In this color processing, the color matching calculation is done by using the frequency-converted coefficients. If AC components are contained, a complicated calculation is required for color conversion. Since, however, no AC components are contained, the value has a linear relationship with the value which is inversely frequency-converted. This effectuates a simple color matching calculation.

For example, in the practical examples illustrated in FIGS. 7 to 9 the calculation must be performed (2n×5n) times for the first 2n lines, if color processing is done from the bit map in accordance with the conventional method. However, as can be seen from the lower half of FIG. 9, different differential DC components appear only four times. That is, color processing for the entire region can be accomplished by performing the calculation only four times.

Second Embodiment

The first embodiment realizes a large reduction in the calculation time for color matching by performing color processing in developing or decompressing PDL codes of a character • graphic code and an image code. In this second embodiment, raw image data is directly color-processed with a high efficiency.

Figure 11:
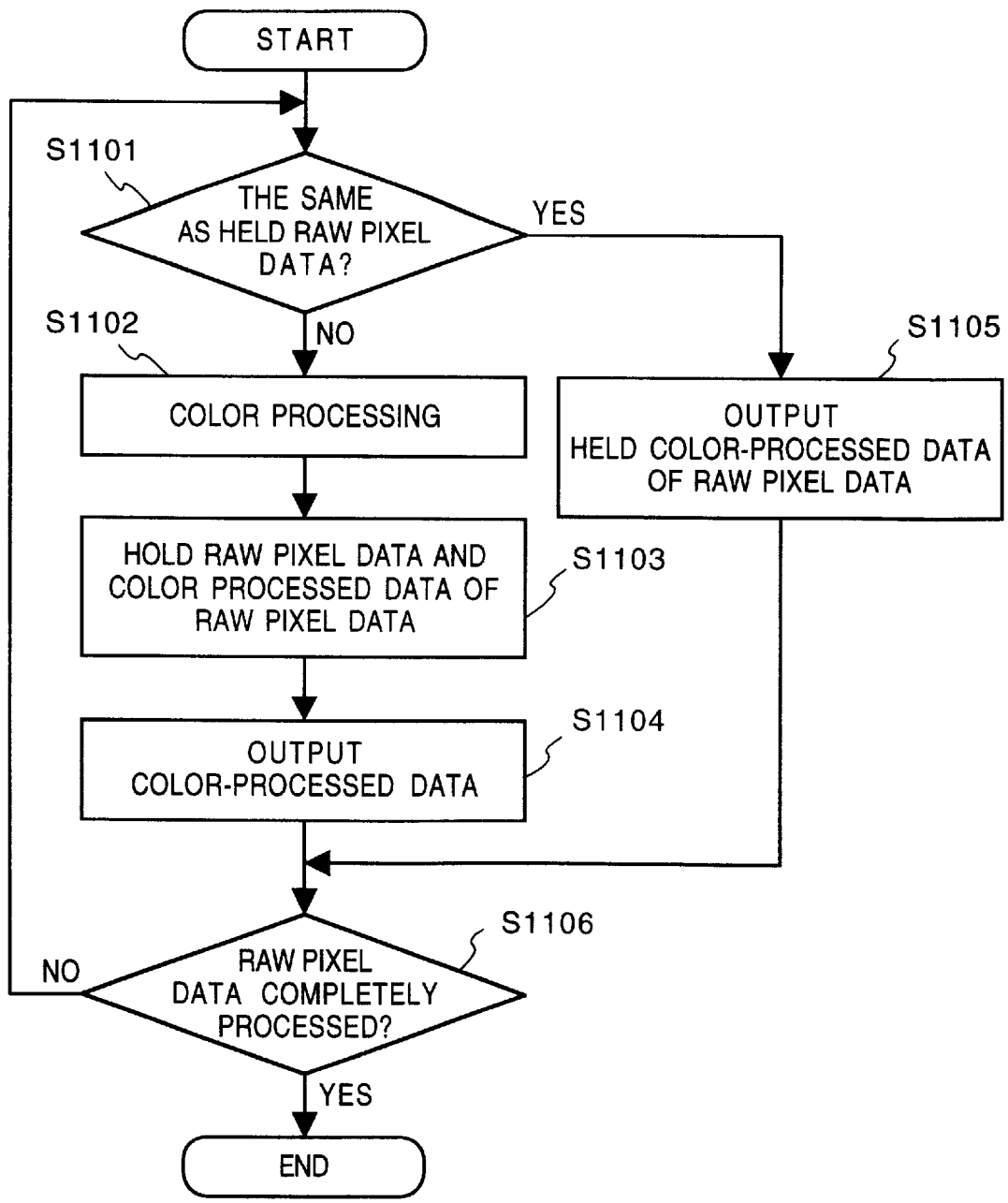
FIG. 11 is a flow chart showing the procedure in the second embodiment.

FIG. 11 is a flow chart best illustrating the characteristic feature of the second embodiment. An apparatus of this second embodiment includes a holding means for holding several pieces of raw image data and a holding means for holding color-processed color data corresponding to these raw images. That is, the correspondence between raw image data and color-processed data, for color data once calculated, is held in the form of a lookup table. In this way duplication of the calculation for the same raw image data is avoided.

In step S1101, whether input raw image data is the same as the held raw image data is checked. If NO in step S1101, the flow advances to S1102 to perform color matching processing corresponding to the color characteristics of an output device. In step S1103, the original raw image data is held in the raw image data holding means, and the color-processed data is held in the color-processed color data holding means. In step S1104, the color-processed data is output.

If it is determined in step S1101 that the input raw pixel data is the same as the held raw pixel data, the flow advances to step S1105 to output color-processed data corresponding to the held raw pixel data. In this case no color processing calculation is executed. In step S1106, whether the raw pixel data is completely processed is checked. If NO in step S1106, the processing activities from step S1101 to step S1105 are repeated. If the raw pixel data is completely processed, this color processing also is ended.

If image data to be processed is formed by, e.g., DTP software, the same pixel value tends to continue or a pixel value once appearing tends 'to repeatedly appear. If this is the case, the use of the present invention obviates reexecution of the color processing calculation, and this greatly shortens a huge calculation time for that purpose.

Figure 12:
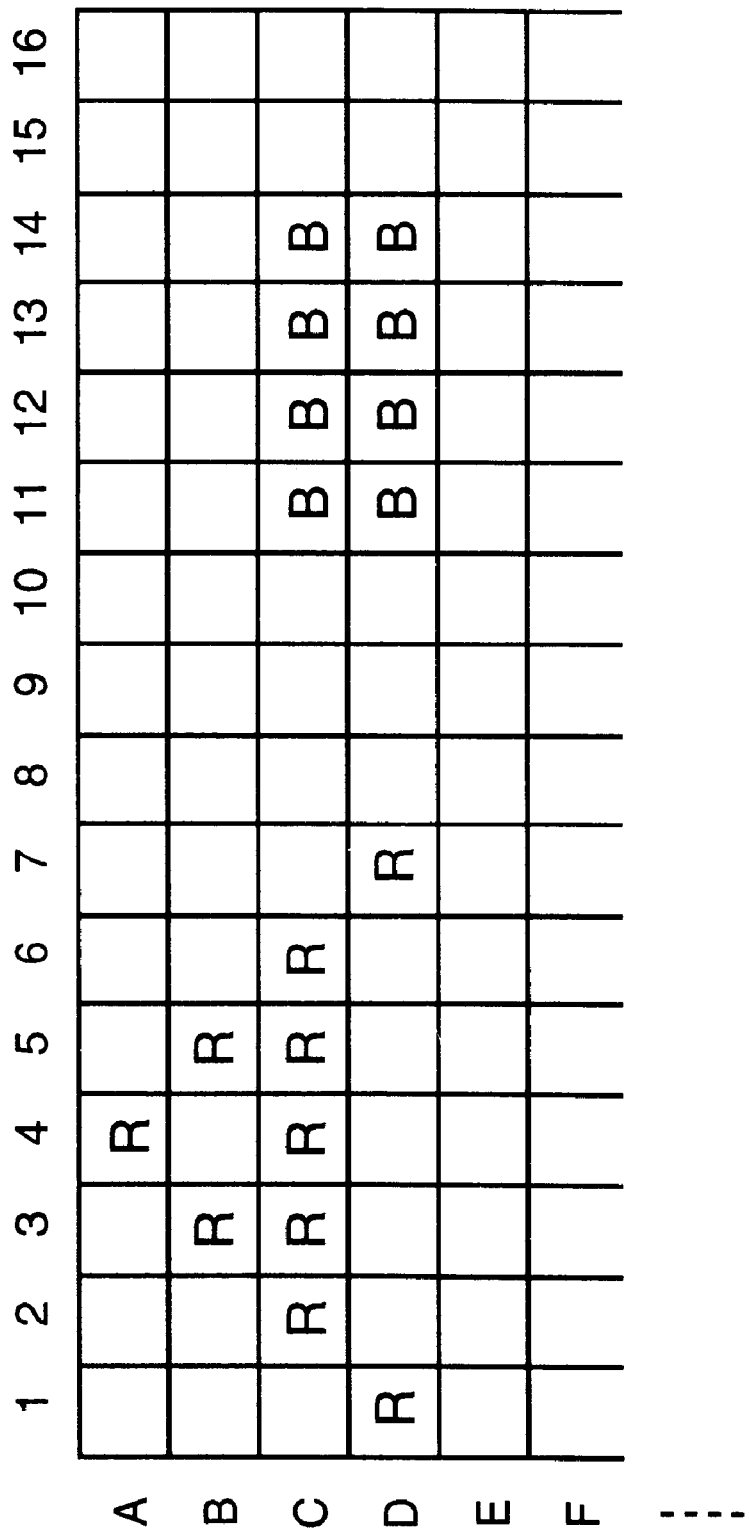
FIG. 12 is a view showing an example of image data for explaining the effect of the second embodiment.

This reduction in the number of calculation times will be described below by taking the image data in FIG. 12 as an example. Referring to FIG. 12, one square indicates one pixel, and image data having a width of 16 pixels are present in six lines A to F. Each blank square indicates a white pixel, each "R" square indicates a red pixel, and each "B" square indicates a blue pixel. When pixel data is input in a raster sequential manner, a white pixel as the line A, column 1 pixel (to be referred to as a pixel A-1 hereinafter) is color-processed. Thereafter, for pixels A-2 and A-3 the respective color-processed data are output. A red pixel A-4 is then processed, and after that the held color-processed color data are used for pixels A-5, A-6, . . . , A-16, B-1, B-2, B-3, . . . , B-16, and C-1, C-2, . . . , C-10, until the data of a blue pixel C-11 is color-processed. Thereafter, the held color-processed data are used until a pixel F-16 without performing any new color processing calculation. In this example, therefore, the color processing calculation needs to be performed 6×16=96 times if the conventional method is used. However, the use of the method of the present invention realizes color processing for all pixels in this region by performing the calculation only three times.

Note that the number of data that can be stored depends upon the capacity of a memory (e.g., a RAM). In reality, the number of colors formed by DTP is less than the number of colors of a natural image photographed by a video camera or the like device. Therefore, the memory need only have a certain appropriate capacity.

Since natural images have a large number of colors, it is desirable to utilize as large a memory capacity as possible. However, if no new storage area can be assured, new data is overwritten on the oldest stored data. That is, the lookup table is dynamically rewritten. In either case, if color-processed data for input data is already held, this held data is used. If no held data is present, color processing is performed, and the resulting data is held and output.

According to the second embodiment as described above, in performing color matching for input image data, if the input image data is the same as previously processed data, this stored data is used. Consequently, it is possible to greatly improve the processing speed.

In the first and second embodiments described above, conversion from the RGB to the YMC color space is taken as an example of the color matching processing. Since, however, the characteristic feature of the present invention resides in color space conversion, the present invention is of course applicable to conversion between other types of color spaces. Therefore, the present invention is not limited to the above-mentioned embodiments.

Also, in the first embodiment, steps S207 and S208 in FIG. 2 are executed if AC components are "0" in a decompressed pixel block. This processing can have a certain margin. As an example, if it is intended to give the speed priority, the processing can be performed when individual AC components (or the mean of the components) are T or less. It is needless to say that this value of T is desirably an appropriately small value. It is also possible to allow an operator to freely change the value of T when desired (note that the default value of T is 0).

According to the embodiments as described above, in outputting a color-designated character code or line drawing to a visual image output device, it is possible to efficiently and rapidly convert the data into data in a color space which depends on the visual image output device.

Additionally, coded color image data obtained by frequency conversion in units of blocks of a predetermined number of pixels can be efficiently and rapidly converted into data in a color space which depends on a visual image output device.

Also, the above two effects can be achieved at the same time.

Furthermore, data which depends on a visual image output device can be efficiently generated from color images having essentially the same tone of color, without essentially performing processing for converting into the data depending on the output device.

Third Embodiment

Figure 17:
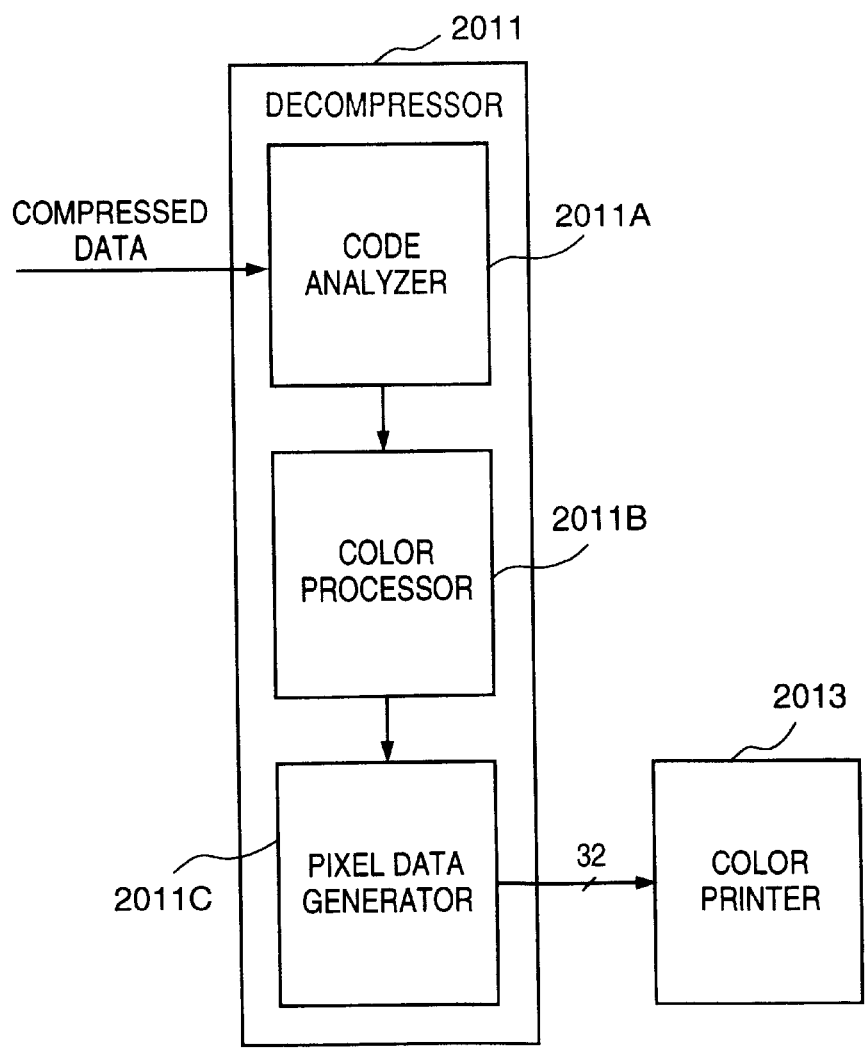
FIG. 17 is a block diagram showing the configuration of an image processing apparatus according to the third embodiment of the present invention.

FIG. 17 is a block diagram showing the configuration of an image processing apparatus according to the third embodiment of the present invention. This apparatus performs conversion, which matches the characteristics of an output device, only for data expressing the representative color of compressed image data, decompresss the compressed data!into bit-map data by using the converted data, and outputs the color image data to the output device.

More specifically, in FIG. 17 input compressed data is converted into, e.g., 8-bit Y, M, C, and K pixel data by a decompressor 2011 which includes a code analyzer 2011A, a color processor 2011B, and a pixel data generator 2011C. The decompressor 2011 transfers the pixel data to an output device such as a color printer 2013. The pixel data generator 2011C includes a buffer for storing color data of several colors and updates the contents of the buffer in accordance with the analytical result from the code analyzer 2011A. In performing the updating, the color processor 2011B performs color matching, and the color-matched color data is written in the buffer. Note that the color matching herein mentioned is done in accordance with the color characteristics of the output device. Examples of the color matching are color space conversion, luminance-density conversion, color reproducible range conversion, masking, UCR, and γ conversion. In the following description, C, M, Y, and K data is output to the color printer. However, this embodiment is not restricted to this operation, so R, G, and B data also can be output if the output device is a color monitor.

Details of the processing of this embodiment will be described below. First, compressed data to be processed by the embodiment will be described. Note that the compressed data to be processed by this embodiment is not limited to the one to be described below, so any compressed data having a similar format can be used.

Figure 18:
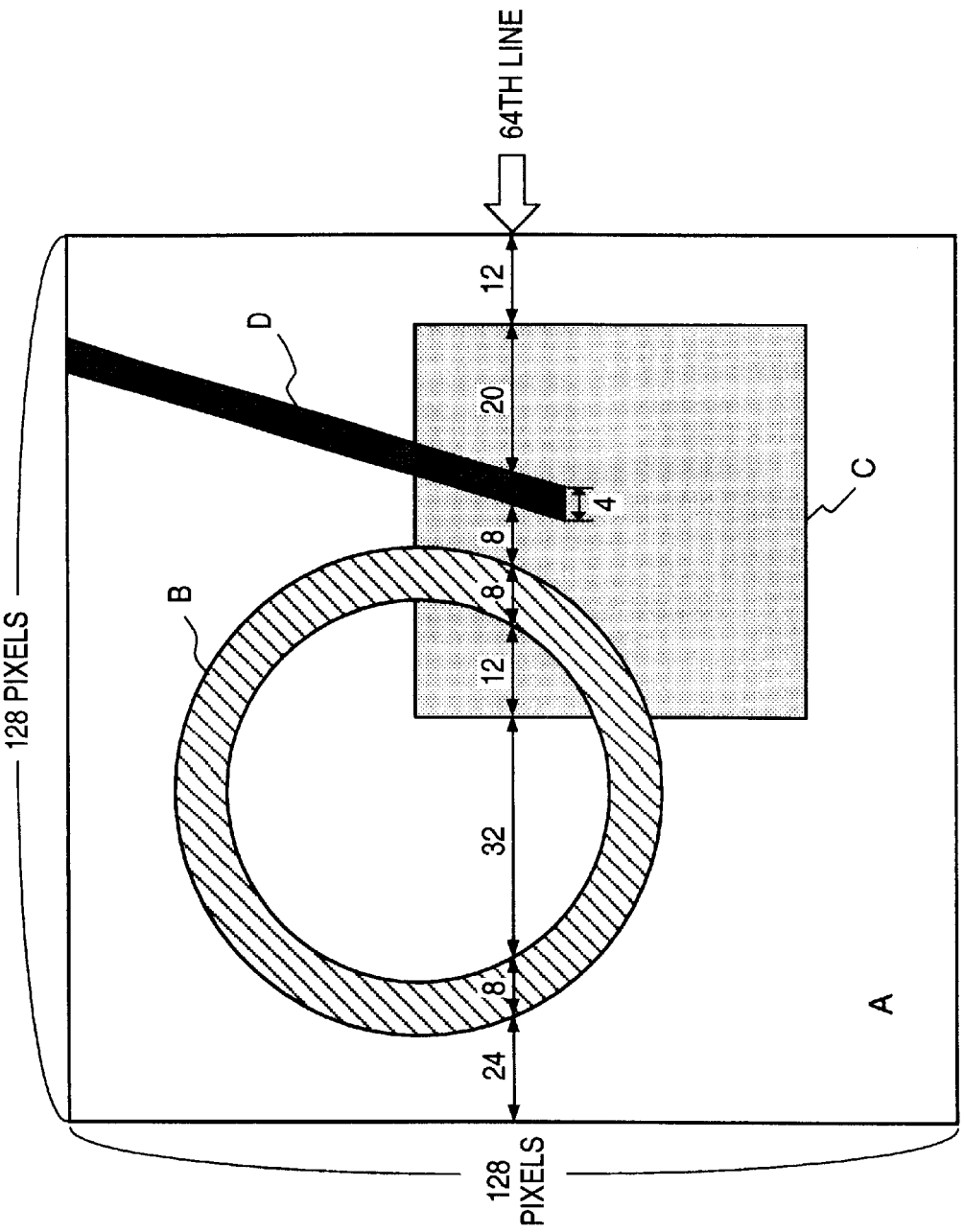
FIG. 18 is a view showing an example of an image.

FIG. 18 shows an example of an image. This image is a multi-color image of 128×128 pixels, eight bits for each of R, G, and B. On a white background indicated by A, a reddish ring B, a bluish square C, and a black line D are drawn. This image is compressed following the order of rasters on the basis of the color data and the run length (the number of successive pixels of the same color). For the sake of illustrative simplicity, only compression for the 64th line will be described assuming the maximum run length is 255 (i.e., represented by eight bits).

As in FIG. 18, the 64th line consists of 24 pixels of the color A, 8 pixels of the color B, 32 pixels of the color A, ..., 12 pixels of the color A. Assuming the individual color data are represented as follows, the compression result is as shown in FIG. 19.

Color A: RGB=(255,255,255)

Color B: RGB=(240, 64, 0)

Color C: RGB=(128,128,255)

Color D: RGB=(0, 0, 0)

Referring to FIG. 19, the first 24 bits of the 32 bits of each line are R, G, and B data, and the last 8 bits are run length. That is, in FIG. 19 the first line shows that the color A continues 24 pixels, the second line shows that the color B continues 8 pixels, and so on. Although one line of the original image has 3 bytes×128 pixels=384 bytes, when the 64th line is compressed the consequent line has 4 bytes×9= 36 bytes; i.e., the data is compressed to approximately 1/10 the original data.

Figure 20:
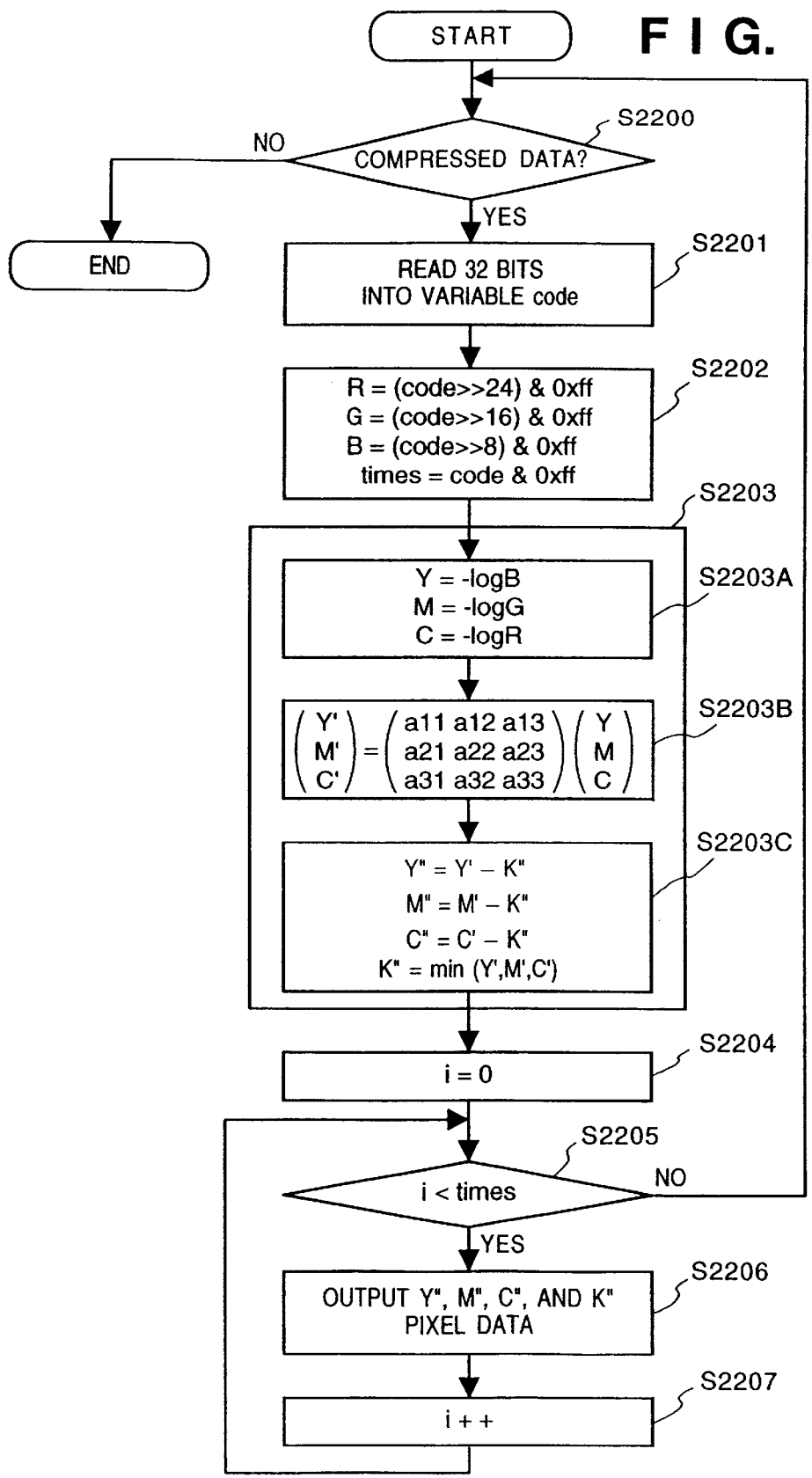
FIG. 20 is a flow chart showing an example of the procedure of expansion in the third embodiment.

FIG. 20 is a flow chart showing an example of the procedure of decompressing the data compressed as above and outputting the decompressed data. This procedure is executed by the decompressor 2011 when the compressed data is input.

Referring to FIG. 20, whether unprocessed compressed data is present is checked in step S2200. If YES in step S2200, the flow advances to step S2201. If NO in step S2200, the processing is ended.

If unprocessed compressed data is present, a set of codes (32 bits in the code example shown in FIG. 19) are read into a variable "code" in step S2201 and the codes are analyzed in step S2202. That is, in step S2202 the variable "code" is shifted to the right 24 bits and ANDed with mask data FFH, and R data is extracted. Analogously, the variable "code" is shifted to the right 16 bits and ANDed with FFH to extract G data, and the variable "code" is shifted to the right 8 bits and ANDed with FFH to extract B data. In addition, the variable "code" and FFH are ANDed to extract the run length, and the value is stored in a variable "times". Note that the shift amount and the mask data naturally change in accordance with the form of a code, i.e., the 25 arrangements and the bit sizes of the R, G, and B data and the run length.

In step S2203, color matching is performed for the R, G, and B color data of the analyzed code and the resulting Y", M", C", and K" data is stored in the buffer. More specifically, in step S2203A the R, G, and B data is converted into the C, M, Y, and K data by LOG conversion. In step S2203B, the C, M, Y, and K data is converted into C', M', and Y' data which matches the color characteristics of the output device by performing a masking calculation. In step S2203C, a minimum value min(Y',M',C') is subtracted from the C', M', and Y' data by UCR and black data K" is also generated.

Subsequently, a variable i is set to zero in step S2204 and the variable i is compared with the variable "times" in step S2205. If i<times, the flow advances to step S2206; if not, the flow returns to step S2200. In step S2206, the Y", M", C", and K" data stored in the buffer is output. In subsequent step S2207 the variable i is incremented, and the flow returns to step S2205. Consequently, the loop from step S2205 to step S2207 is repeated the number of times corresponding to the variable "times", and the Y", M", C", and K" data stored in the buffer also is output the same number of times. When the loop is repeated the number of times corresponding to the variable "times", the flow returns to step S2200. If unprocessed compressed data is present in step S2200, the next set of codes are processed.

As described above, in this embodiment the color matching is performed only for data expressing the representative color of compressed image data, and the processed color data is output in accordance with the run length, i.e., the length in which pixels continue. This eliminates the need for color matching for each decompressed data, and consequently the operation time required for the color matching can be shortened unless the color changes from one pixel to another in an image. As an example, in the case of the 36-byte compressed data, FIG. 19, color matching needs to be performed 128 times if the processing is done for each pixel data. However, in this embodiment it is only necessary to perform the color processing only 9 times; that is, the operation time can be shorted to about 1/14. It is obvious that the operation time can be further reduced if the number of colors in one line is smaller. For example, a line consisting of one color can be processed by one-time operation.

Fourth Embodiment

An image processing apparatus according to the fourth embodiment of the present invention will be described below. Note that in the fourth embodiment, the same reference numerals as in the third embodiment denote the same parts and a detailed description thereof will be omitted.

An operation in which compressed data subjected to compression (to be referred to as "pallet compression" hereinafter) is decompressed in a raster order will be described below. For the sake of illustrative simplicity, assume the pallet has two bits (four colors). To practically pallet-compress color images, however, a pallet having at least 8 bits (128 colors) is necessary.

Figure 21:
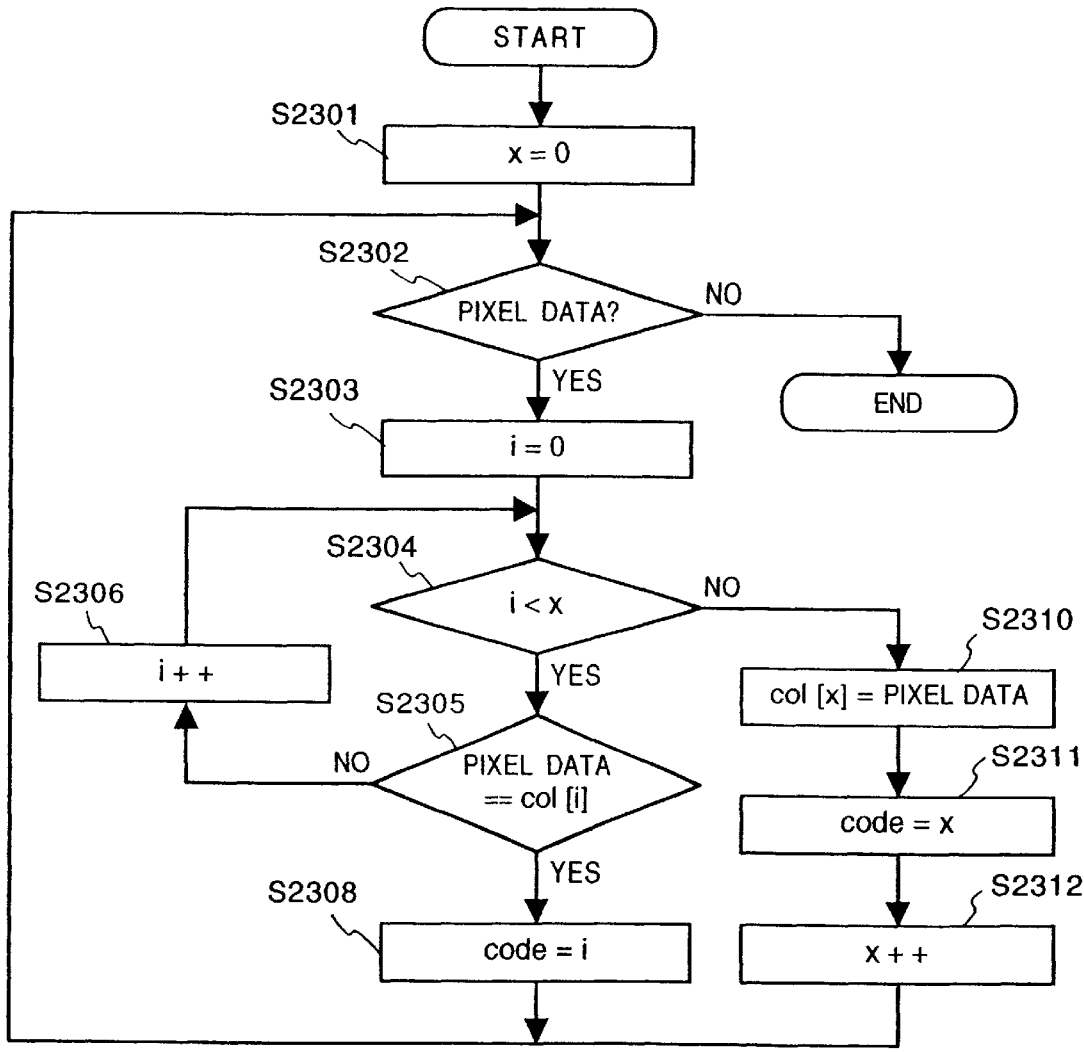
FIG. 21 is a flow chart showing an example of the procedure of image data compression based on pallet compression.

FIG. 21 is a flow chart showing the procedure of compressing image data by pallet compression.

In step S2301, zero is set as a variable x which represents the number of set pallet colors. In step S2302, whether unprocessed pixel data is present is checked. If YES in step S2302, the flow advances to step S2303. If NO in step S2302, the processing is ended. If unprocessed pixel data is present, zero is set as a variable i in step S2303, and the variables i and X are compared in step S2304. If i<x in step S2304, the flow advances to step S2305; if not, the flow advances to step S2310.

If i<x in step S2304, the pixel data and a pallet col[i] are compared in step S2305. If pixel data=col[i] in step S2305, the value of the variable i is set as a compression code "code" in step S2308, and the flow returns to step S2302. If pixel data≠col[i] in step S2305, the variable i is incremented in step S2306, and the flow returns to step S2304.

If the flow advances to step S2310, the pixel data is set in a pallet col[x]. In step S2311, the value of the variable x is set as the compression code "code". In step S2312, the variable x is incremented. The flow then returns to step S2302.

Assume that the image shown in FIG. 18 is compressed by the procedure shown in FIG. 21. At the first pixel, the flow advances to step S2310 since i=x=0, and data (255, 255,255) of color A is set in a pallet col[0]. '00' is set as the compression code "code" in step S2311, the variable x is set to 1 in step S2312, and the flow returns to step S2302.

At the second pixel, the flow advances to step S2305 because i=0 and x=1 in step S2304. Since the pixel data agrees with the pallet col[0], '00' is set as the compression code "code" in step S2308, and the flow returns to step S2302. Thereafter, the color A continues for sometime and during that time the pixel data agrees with the pallet col[0] and the compression code "code" is '00'.

When the pixel of color D (0,0,0) is reached, the pixel data and col[0] disagree in step S2305. Consequently, the variable i becomes 1 in step S2306, and the flow advances to step S2310 in which (0,0,0) is set in a pallet col[1]. '01' is set in the compression code "code" in step S2311, the variable x becomes 2 in step S2312, and the flow returns to step S2302.

When this processing is repeated, the data are set in the pallet table in the order of appearance, and the image data compressed using this pallet table has 2 bits/pixel while the original image has 24 bits/pixel. That is, the data is compressed to 1/12. If a practical 8-bit pallet is used, the information amount is, of course, compressed to 1/3 since data of 24 bits/pixel is compressed to data of 8 bits/pixel.

col[0]=(255,255,255): compression code '00' col[1]=(0, 0, 0): compression code '01' col[2]=(240, 64, 0): compression code '10' col[3]=(128,128,255): compression code '11'

Figure 22:
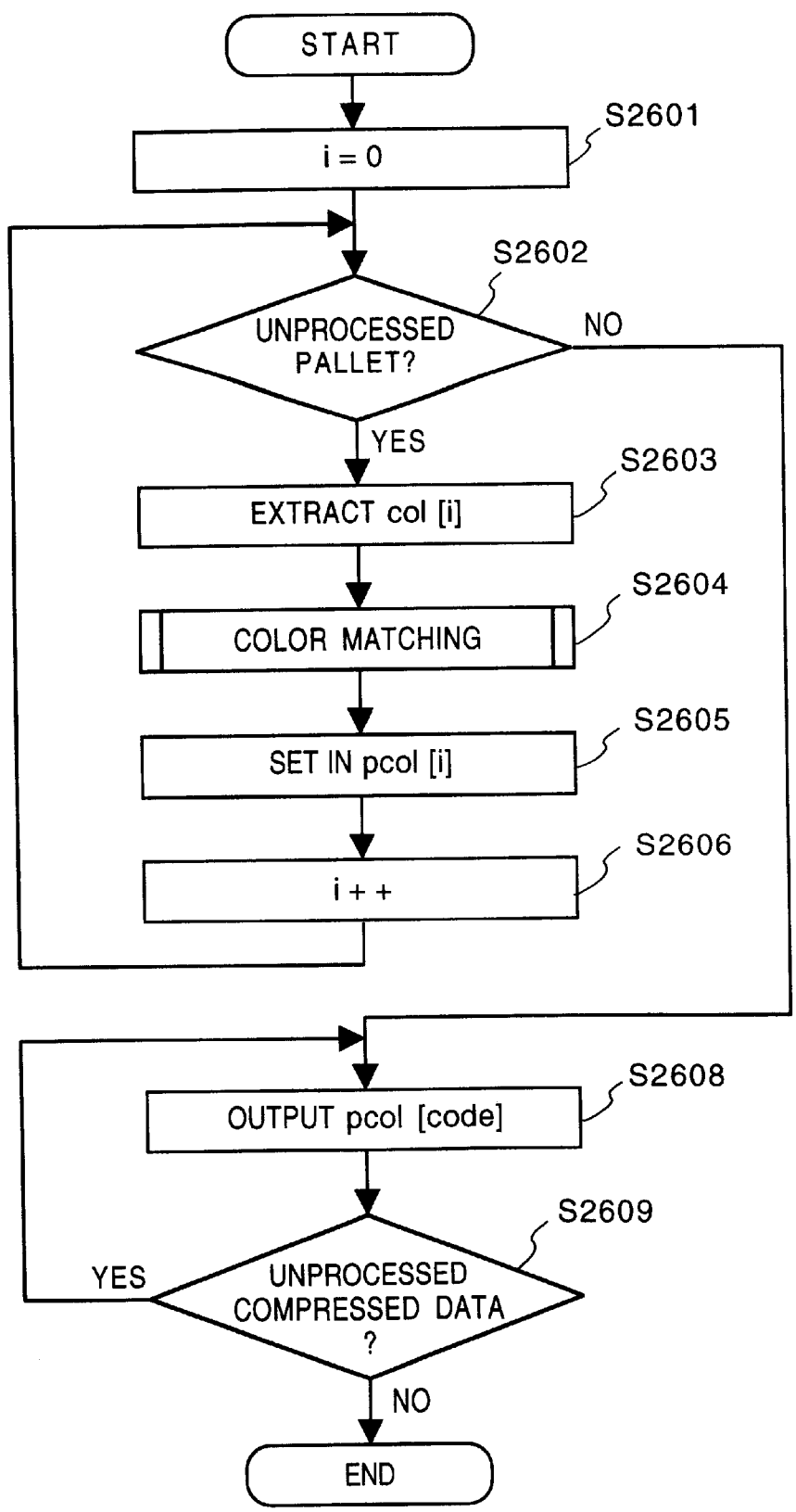
FIG. 22 is a flow chart showing an example of the expansion procedure of an image processing apparatus according to the fourth embodiment of the present invention.

FIG. 22 is a flow chart showing an example of the procedure of decompressing the data thus pallet-compressed and outputting the decompressed data. This procedure is executed by a decompressor 2011 when the compressed data is input.

Referring to FIG. 22, zero is set as the variable i in step S2601 and whether unprocessed pallet data is present is checked in step S2602. If YES in step S2602, the flow advances to step S2603, and the pallet data col[i] is extracted. In step S2604, color processing similar to that in step S2203 of FIG. 7 is performed.

Subsequently, the processed pallet data is set in a pallet pcol[i] in step S2605 and the variable i is incremented in step S2606. The flow then returns to step S2602.

If no unprocessed compressed data is present any longer, the flow advances to step S2608, and a pallet data pcol[code] corresponding to the compressed data code is output. In step S2609, whether unprocessed compressed data is present is checked. If YES in step S2609, the flow advances to step S2608. If NO in step S2609, the processing is ended.

According to this embodiment as described above, in decompressing the pallet-compressed data it is only necessary to perform color matching for data of that pallet table and output the processed pallet data corresponding to the compressed data. It is needless to say that no color matching need be performed for undefined pallets. As an example, for an image of 128×128 pixels compressed by an 8-bit pallet table, an arithmetic operation needs to be performed 16,384 times if color matching is done for each pixel. However, in this embodiment the operation need only be performed a maximum of 256 times in accordance with the number of pallets. That is, the operation time can be reduced to 1/64 or less.

Fifth Embodiment

An image processing apparatus according to the fifth embodiment of the present invention will be described below. Note that in the fifth embodiment, the same reference numerals as in the third embodiment denote the same parts and a detailed description thereof will be omitted.

In this embodiment, colors which have already appeared, e.g., three colors which have already appeared in processing are stored, and, if the color of the pixel of interest in subsequent processing agrees with any stored color, a predetermined code is output. If the color of the pixel of interest disagrees with any stored color, a code indicating the disagreement and the value (color) of the pixel are output, and at the same time colors to be stored are updated. By this third compression method the compressed data of an image is decompressed.

Figure 23:
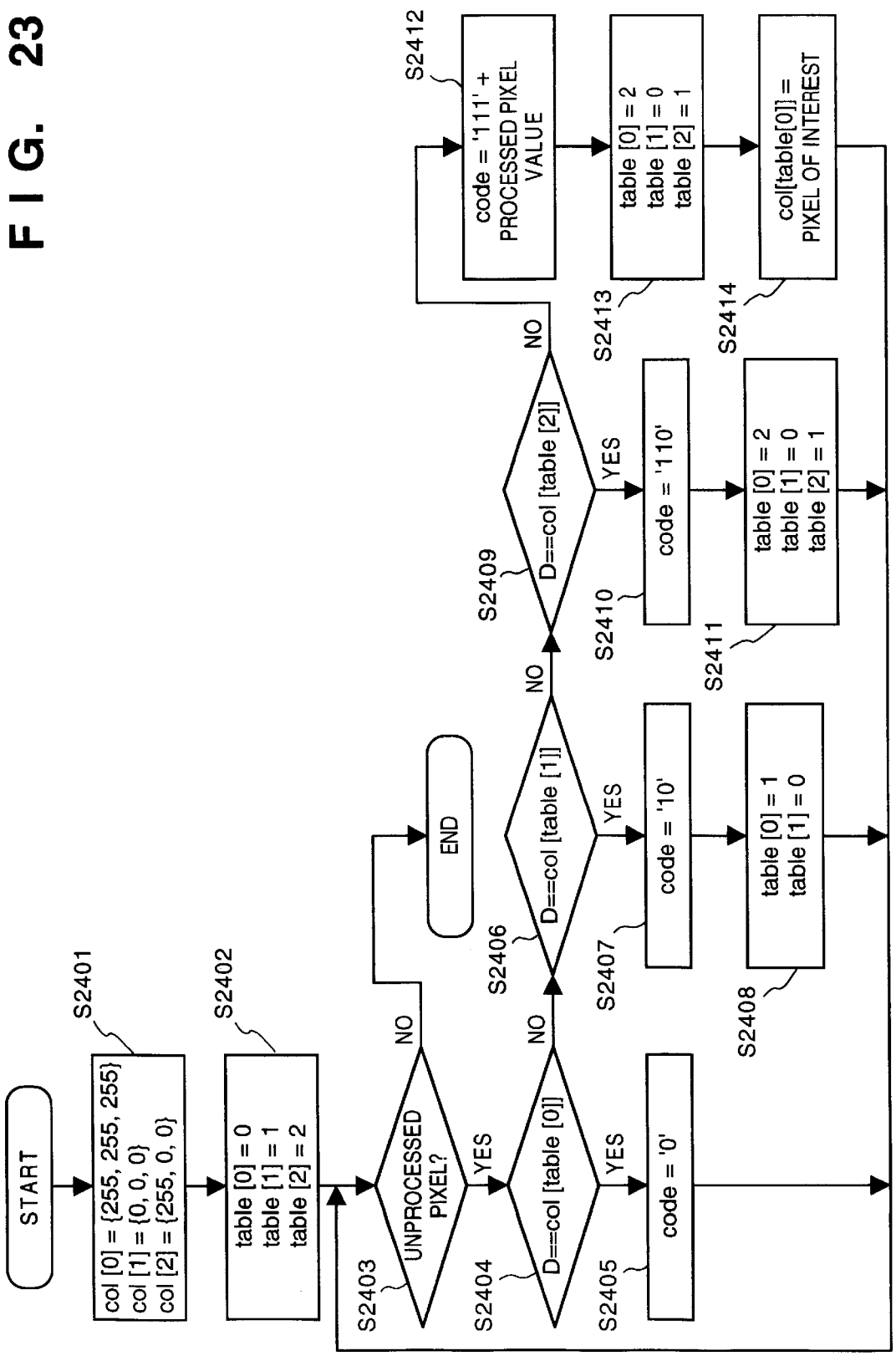
FIG. 23 is a flow chart showing an example of the image compression procedure according to the third compression method.

FIG. 23 is a flow chart showing an example of the procedure of compressing an image in accordance with the third compression method.

In step S2401, initial values of three colors to be stored are set. In this example, white, black, and red, which are expected to appear many times in a document, are stored in variables col[0], col[1], and col[2], respectively. Note that it is also possible to omit this initial value setting. In that case variables col[i] remain blank until the processing progresses and the first three colors are set. In step S2402, the initial order of the variables col[i] is set in variables table[i]. In this example table[0]=0, table[1]=1, and table[2]=2. In step S2403, whether an unprocessed pixel is present is checked. If YES in step S2403, the flow advances to step S2404. If NO in step S2403, the processing is ended.

If an unprocessed pixel is present in step S2403, whether a value D of the pixel of interest agrees with the set color col[table[0]] is checked in step S2404. If YES in step S2404, the flow advances to step S2405 to set '0', in a code "code". The flow then returns to step S2403.

If D≠col[table[0]] in step S2404, the flow advances to step S2406 to check whether D agrees with col[table[1]]. If YES in step S2406, the flow advances to step S2407 to set '10' in the code "code". After the variables table[i] are changed such that table[0]=1 and table [1]=0 in step S2408, the flow returns to step S2403. The variables table[i] are thus changed because this compression method is to generate variable-length codes, so 1-, 2-, and 3-bit codes are assigned in the order of col[table[0]], col[table[1]], and col[table[2]]. Accordingly, the efficiency is improved when a color which appears more often is set in col[table[0]], and for that purpose the variables table[i] need to be changed. For example, if the color order which is set immediately before step S2408 is "white,black,red", after the processing the order is "black,white,red".

If D≠col[table[1]] in step S2406, the flow advances to step S2409 to check whether D agrees with col[table[2]]. If YES in step S2409, the flow advances to step S2410 to set '110' in the code "code". In step S2411, the variables table[i] are changed such that table[0]=2, table[1]=0, and table[2]=1 for the same reason as above. The flow then returns to step S2403.

If D disagrees with any of the variables table[i], the flow advances to step S2412 to set, e.g., 27 bits, which include a code '111' indicating the disagreement and the value D of the pixel of interest, in the code "code". In step S2413, the variables table[i] are changed such that table[0]=2, table[1]=0, and table[2]=1 for the same reason as described above. After the value D of the pixel of interest is set in col[table[0]] in step S2414, the flow returns to step S2403.

Compressed image data can be obtained by performing the above processing for all pixels. Depending on the type of image the processing activities from step S2412 to S2414 are performed a large number of times to increase the data size of the compression result in some instances. However, a document formed by DTP is generally compressed to approximately 1/20.

Figure 24:
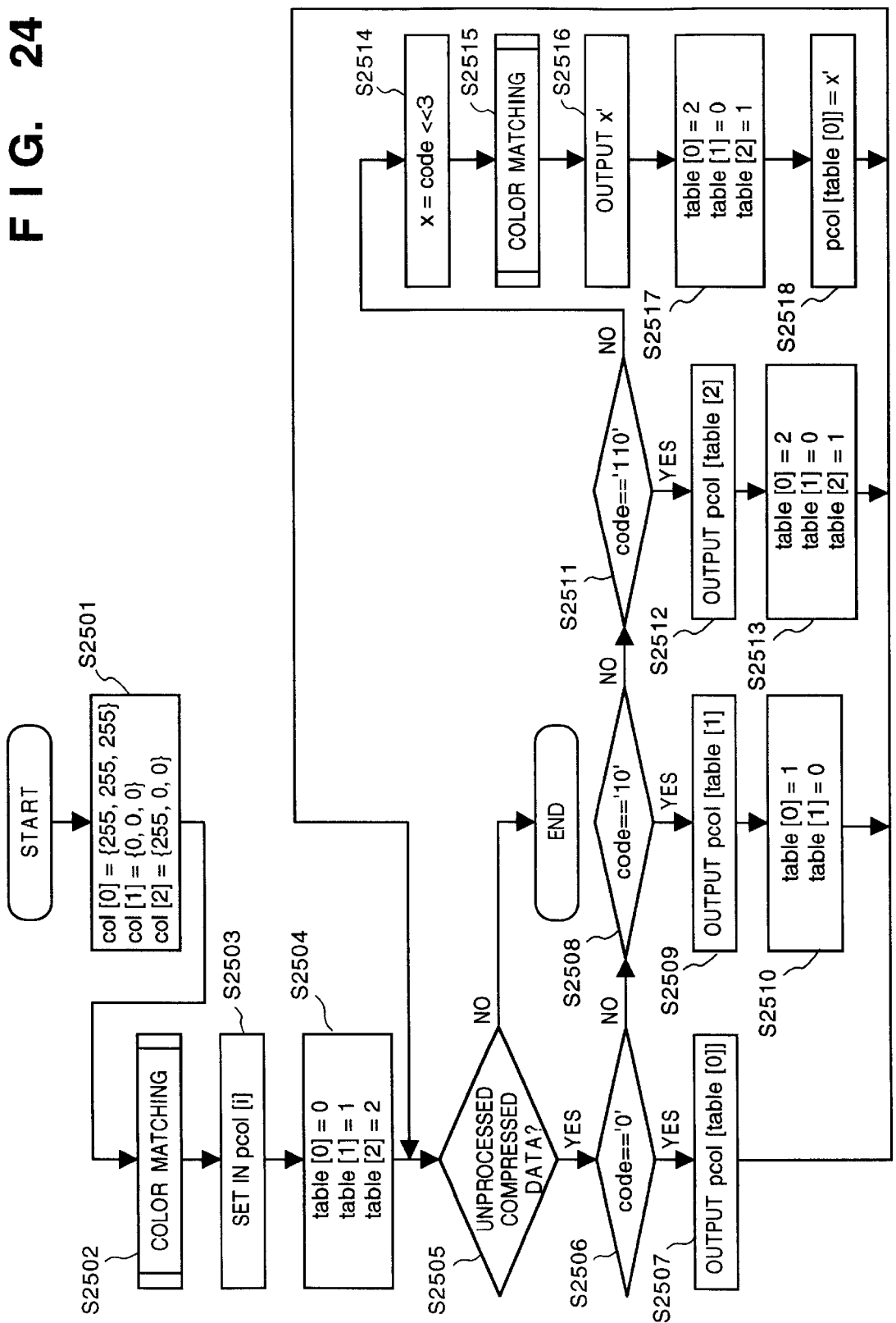
FIG. 24 is a flow chart showing an example of the expansion procedure of an image processing apparatus according to the fifth embodiment of the present invention.

FIG. 24 is a flow chart showing an example of the procedure of decompressing the data thus compressed and outputting the decompressed data. This procedure is executed by a decompressor 2011 when the compressed data is input.

In step S2501, initial values of the same colors as in the compression are set in variables col[i]. In step S2502, color matching analogous to that in step S2203 of FIG. 7 is performed for the three initially set colors. In step S2503, the color-matched data is set in variables pcol[i]. For example, when the output device is a color printer and R, G, and B data of three colors, white, black, and red, are set in col[i], the C, M, Y, and K data set in pcol[i] are as follows:

col[0]={255,255,255} col[1]={0, 0, 0} col[2]={255, 0, 0} pcol[0]={0, 0, 0, 0} pcol[1]={0, 0, 0,255} pcol[2]={0,255,255, 0}

Note that this initial value setting is sometimes omitted as previously mentioned in the explanation of compression. That is, if the initial value setting is omitted in the compression, no setting is done in the expansion; if initial values are set in the compression, the same values are set in the expansion.

Subsequently, in step S2504 the initial order of pcol[i] is set in variables table[i]. This initial order must be the same order as in the compression. In this example table[0]=0, table[1]=1, and table[2]=2. Whether unprocessed compressed data is present is then checked in step S2505. If YES in step S2505, the flow advances to step S2506. If NO in step S2505, the processing is ended.

If unprocessed compressed data is present, whether compressed data code is '0' is checked in step S2506. If code='0', the flow advances to step S2507, and pcol[table[0]] is output. The flow then returns to step S2505.

If code≠'0', the flow advances to step S2508, and whether the compressed data code is '10' is checked. If code='10', the flow advances to step S2509, and pcol[table[1]] is output. After the variables table[i] are changed in step S2510, the flow returns to step S2505. Note that the variables table[i] need to be changed in the same way as in the compression, so in this example table[0]=1 and table[1]=0.

If code≠'10', the flow advances to step S2511, and whether the compressed data code is '110' is checked. If code='110', the flow advances to step S2512, and pcol[table[2]] is output. In step S2513, the variables table[i] are changed such that table[0]=2, table[1]=0, and table[2]=1. The flow then returns to step S2505.

If code≠'110', the flow advances to step S2514, and the compressed data code is shifted to the left three bits to extract the color data, and sets the color data in a variable x. In step S2515, color matching similar to that in step S2502 is performed for the variable x. In step S2516, the processing result, x', is output. Note that the shift amount when the color data is extracted from the compressed data changes in accordance with the number of bits of the code representing disagreement mentioned earlier. In step S2517, the variables table[i] are changed such that table[0]=2, table[1]=0, and table[2]=1. In step S2518, the value of the variable x', i.e., the color-processed new color data, is set in pcol[table[0]]. The flow then returns to step S2505.

According to this embodiment as described above, in decompressing the data compressed by the third compression method, it is only necessary to execute color matching for the color data set as initial values and the color data corresponding to the code indicating disagreement. Therefore, it is evident that the number of execution times of the arithmetic operation for the color matching can be greatly reduced compared to the case where the color matching is performed for each pixel. This makes it possible to greatly shorten the operation time.

In the above embodiment the number of colors to be stored is three. However, the present invention is not limited to this embodiment, so two colors, four colors, or any larger number of colors can be stored. Also, if data disagrees with any stored color', compressed data is formed by combining the code indicating this disagreement and the value (color data) of the pixel of interest. However, any information can be added to the code so long as the information represents a color. As an example, it is possible to add data indicating the difference from the stored color or a pallet code by additionally forming a pallet table.

According to the embodiments of the present invention as described above, it is possible to provide an image processing apparatus and method capable of reducing processing of decompressing a compressed image and outputting the decompressed image to an output device. For example, processing such as color conversion can be reduced, resulting in a short processing time.

The present invention can be applied to a system constituted by a plurality of devices such as a host computer and a printer or to an apparatus comprising a single device such as a facsimile apparatus. Also, the present invention is naturally applicable to a case where the invention is achieved by supplying a program stored in a medium to a system or an apparatus. Furthermore, as the output device it is possible to use a display device, such as a CRT or an FLCD, in addition to a laser beam printer or an ink jet printer.

Figure 25:
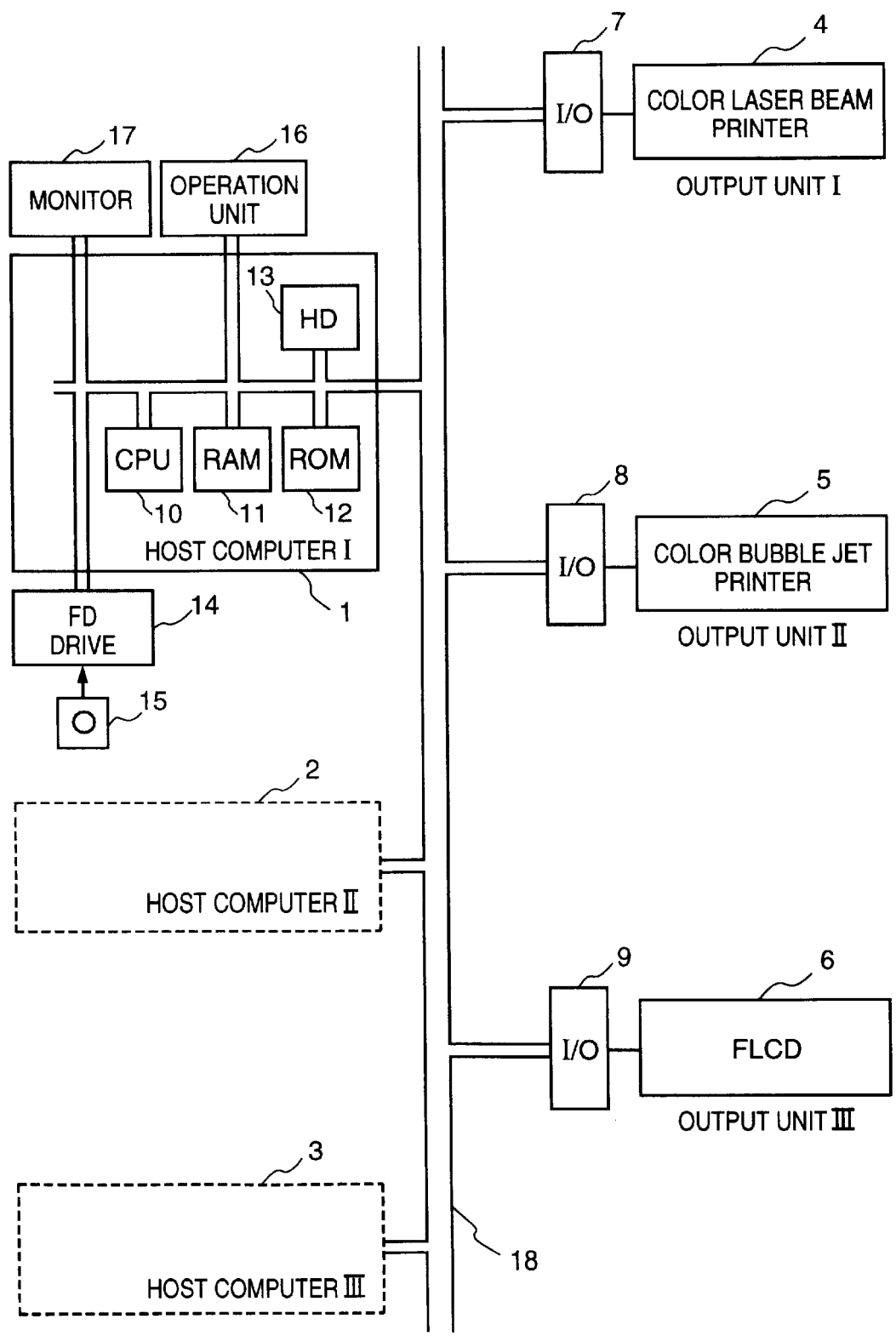
FIG. 25 is a block diagram showing the system configuration for practicing the present invention.

FIG. 25 is a view showing an example of the system configuration for performing the algorithms in the first to fifth embodiments described above.

In FIG. 25, reference numerals 1, 2, and 3 denote host computers I to III which include constituent elements to be described later; and 4, 5, and 6, output units I to III for performing image formation on the basis of the image data processed by the host computers I, II, and III, respectively. The output unit 4 is a color laser beam printer for printing multivalue color data. The output unit 5 is a bubble jet printer for printing binary color data. The output unit 6 is an FLCD for displaying data by using a ferroelectric liquid crystal. Reference numerals 7, 8, and 9 denote interfaces for connecting the output units I, II, and III to a network 18.

A main CPU 10 of each host computer executes, e.g., the process procedures shown in FIGS. 1, 2, 11, and 20 to 24.

Reference numeral 11 denotes a RAM which is used as a working area of the CPU; 12, a ROM for storing programs and OS of the CPU; and 13, a hard disk. The hard disk 13 stores DTP application software, document image data formed by the software, and image data developed from a PDL code. A floppy disk drive 14 is used to fetch data stored in a floppy disk 15 into the host computer I. It is also possible to store the programs for the processing performed by the CPU 10 in the floppy disk 15 and to realize the procedures of the above-mentioned embodiments on the basis of the programs read out from the floppy disk 15. Also, some other medium such as an optical disk or a magnetooptical disk can be used instead of a floppy disk.

An operation unit 16 includes a keyboard, a mouse, and the like device and is used to manually input commands and data. A monitor 17 is used in the formation of document image data.

Figure 26:
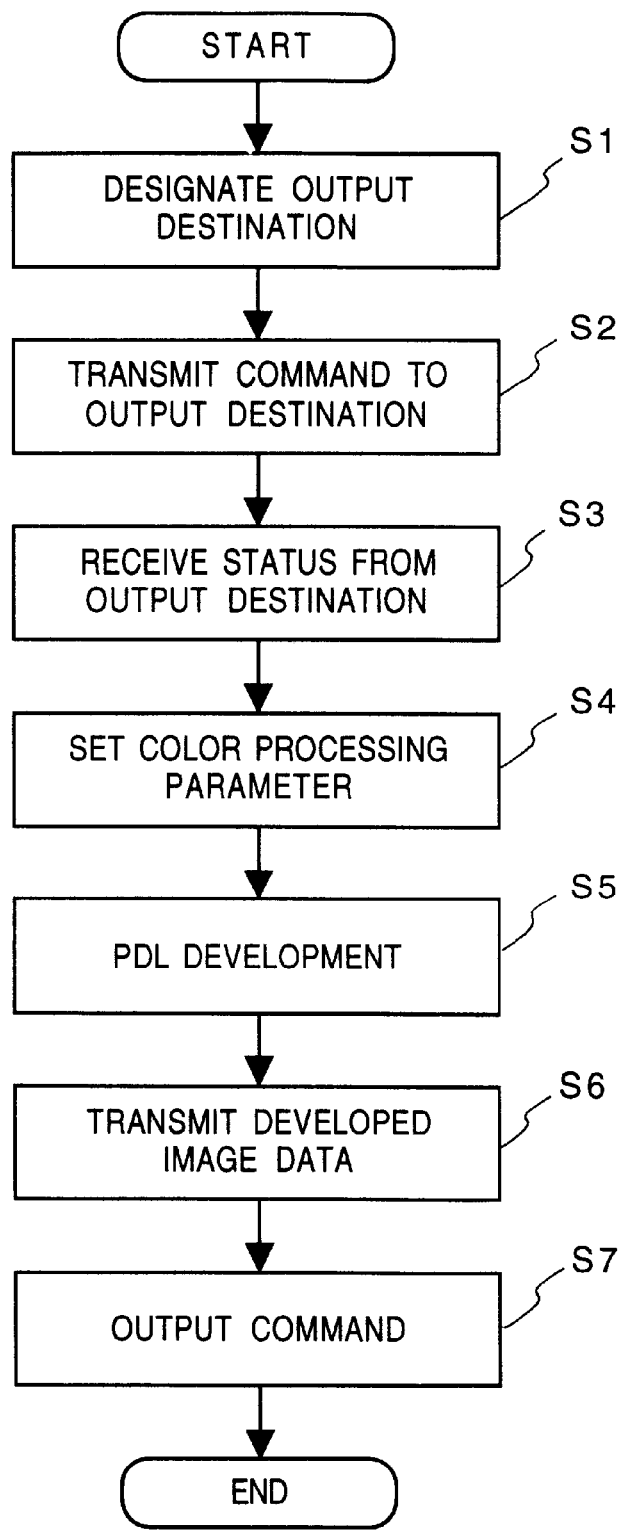
FIG. 26 is a flow chart showing the procedure of practicing the present invention.

FIG. 26 is a flow chart showing the procedure performed by the CPU 10 in realizing the above embodiments of the present invention in the system shown in FIG. 25.

In step S1, an output destination is designated by manual command from the operation unit 16. The CPU 10 fetches this designation information and sets the communication destination. In step S2, the CPU 10 transmits a command to the set output destination. In step S3, the CPU 10 receives status data from the output destination. This status data includes information indicating, e.g., the type (a printer or a monitor) of device as the output destination and the characteristics (color reproduction characteristics (profile)) of the device.

In step S4, on the basis of the received status information the CPU 10 calculates and sets a color processing parameter (e.g., the color conversion matrix in FIG. 4). In step S5, the CPU 10 executes the PDL data development in each of the above embodiments by using the set color processing parameter. In step S6, the CPU 10 transmits the developed image data to the output destination. In step S7, image formation is done by the output destination in accordance with an output command.

Figure 27:
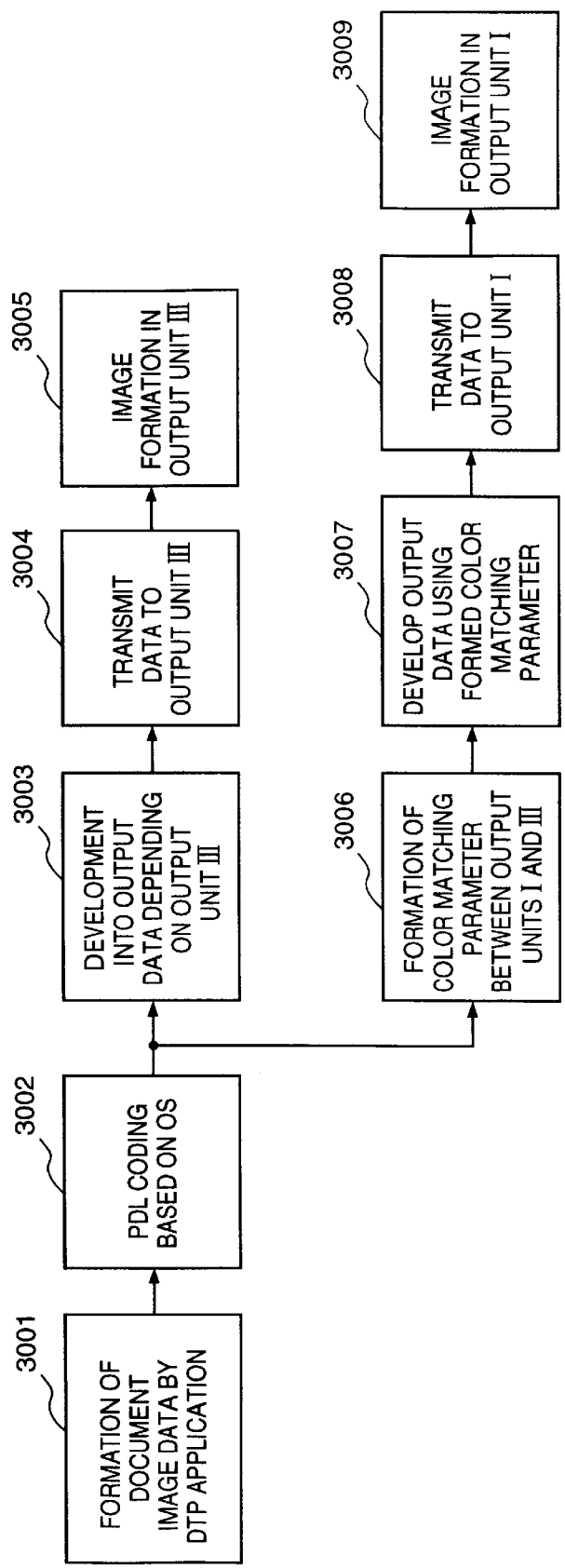
FIG. 27 is a block diagram showing an embodiment in which the present invention is applied to a CMS.

The idea of the above embodiments is applicable to a CMS (Color Management System). FIG. 27 is a block diagram showing an example of the CMS.

Figure 13:
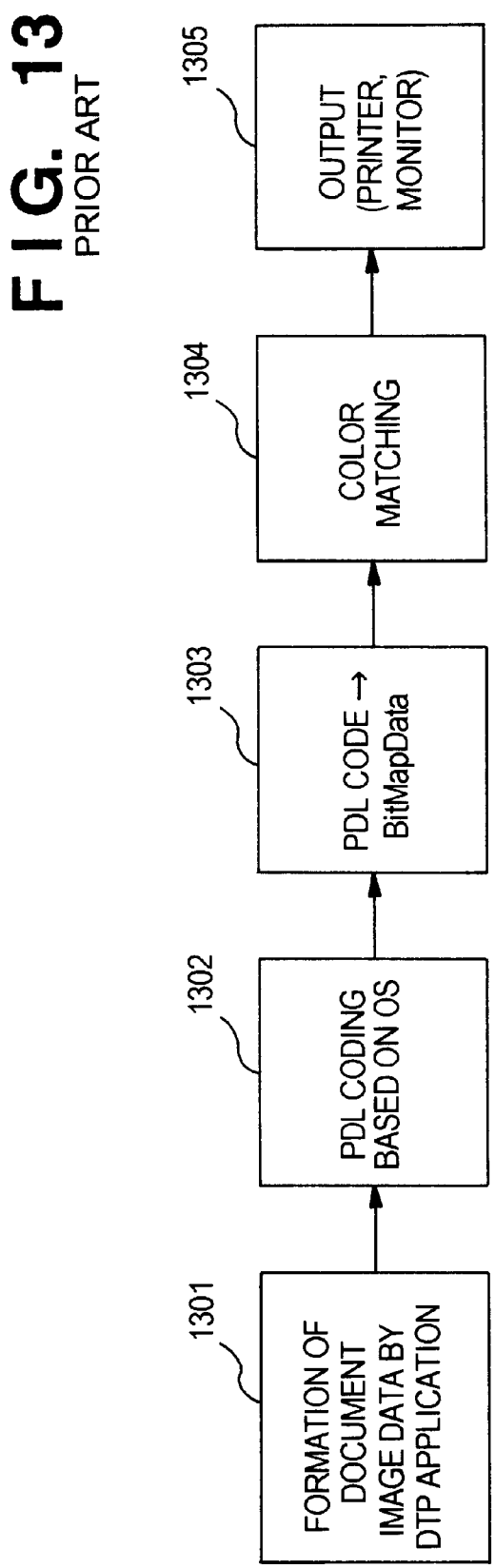
FIG. 13 is a block diagram showing conventional process steps for performing development and color processing for a PDL code.
Figure 14:
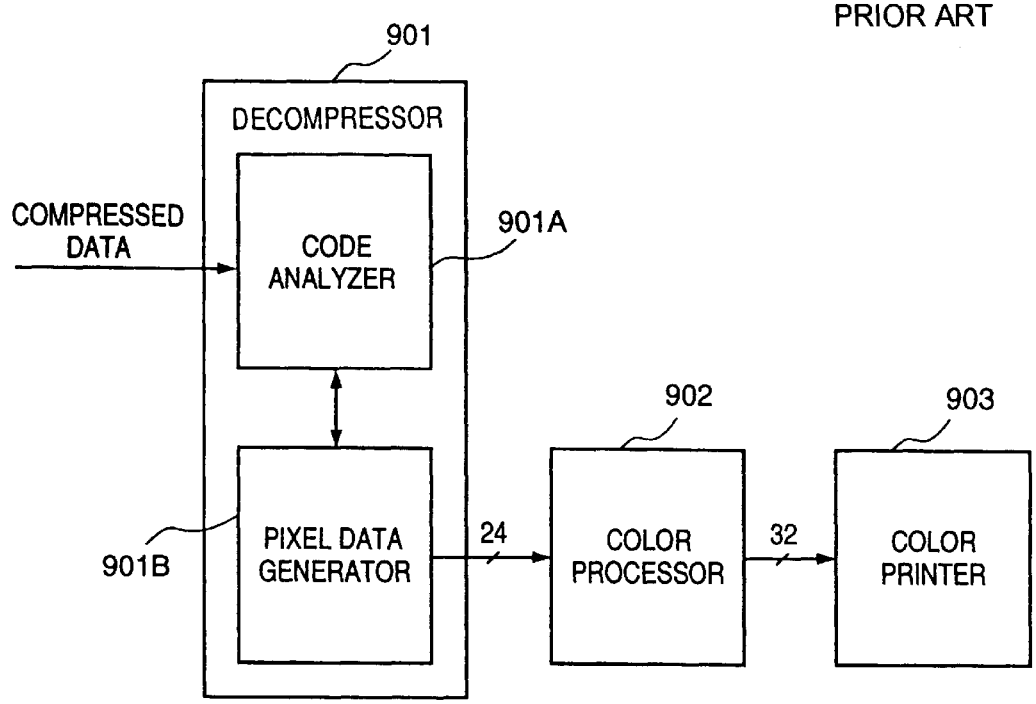
FIG. 14 is a block diagram for explaining the case where compressed data is decompressed and output to a color printer.
Figure 15:
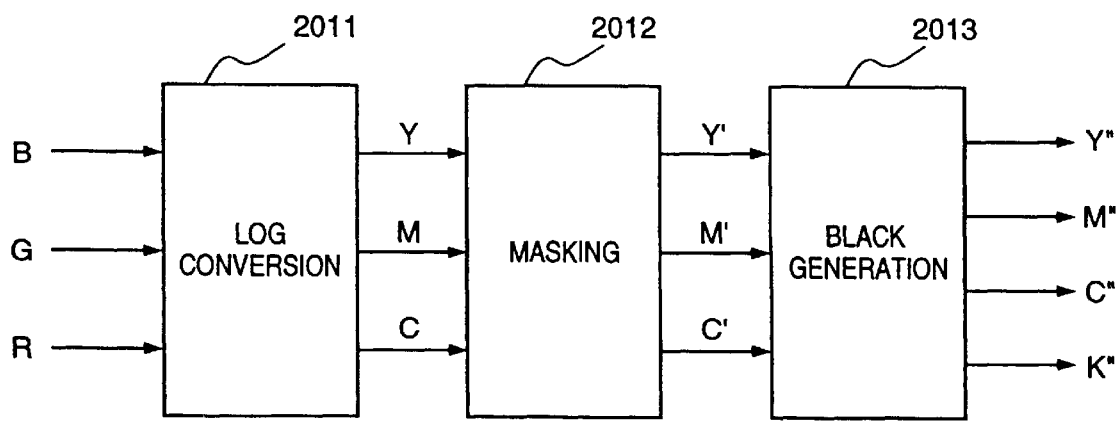
FIG. 15 is a view for explaining the processing of a color processor in FIG. 14.
Figure 16:
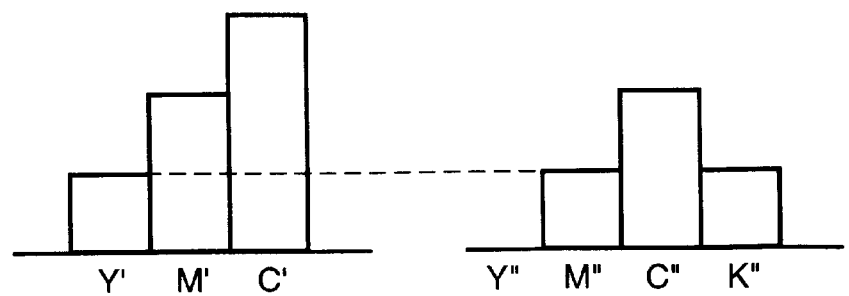
FIG. 16 is a view for explaining black generation.

Document image data is formed by a DTP application in block 3001 and converted into a PDL code based on the OS. These processing activities are similar to those shown in FIG. 13.

In block 3003, the profile of the output unit III, FIG. 25, is received, and a color processing parameter based on this profile is used to perform development into output data which depends on the output unit III.

The output data is transmitted to the output unit III in block 3004, and the output unit III displays the data in block 3005.

If the operator previews the PDL data on the display of the output unit III and determines that the image is a wanted image, the operator forms a hard copy in the output unit I.

To perform color matching between the output units I and III, the CPU 10 receives the profile from the output unit I and forms a color matching parameter in accordance with both of this received profile and the profile of the output unit III (3006).

The CPU 10 then develops the document image, which is PDL-coded in block 3002, into output data by using the color matching parameter (3007), transmits the data to the output unit I (3008), and prints out the data in the output unit I (3009).

With the process procedure as described above, in outputting the same document image from output units different in the color characteristics it is possible to rapidly form image data subjected to color matching between output images.

When the color conversion matrix as shown in FIG. 5 is used as the color matching parameter, this color matching matrix can be formed by synthesizing the matrix for the output unit I and the matrix for the output unit III.

Although color processing is explained in the above example, the present invention can be applied to black-and-white processing such as for multivalue black-and-white images. In this case a $\gamma$ conversion coefficient, for example, also can be used as the color processing parameter in place of the color conversion matrix.

Also, the color processing parameter is not restricted to the color conversion coefficient but can be a coefficient such as an under color removal amount or an inking amount.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which outputs an image via a first output device in accordance with image information, the image being color processed such that the image is matched to an image outputted via a second output device in accordance with the image information, said image processing apparatus comprising:

an inputting unit inputting color image information, including color data, described in a predetermined language;

an acquiring unit acquiring first characteristic data of the first output device and second characteristic data of the second output device from the first output device and the second output device;

a generating unit generating a color matching parameter based on said first and second characteristic data;

a color processor performing color processing on the color data using the color matching parameter to provide processed color data;

a developing unit developing the color image information into color image data for each pixel using the processed color data in accordance with control information for developing, included in the color image information described in the predetermined language; and an outputting unit outputting the color image data to the first output device.

2. The apparatus according to claim 1, wherein the predetermined language is a page description language.

3. An apparatus according to claim 1, wherein the first or second output device is a color printer.

4. An apparatus according to claim 1, wherein the first or second output device is a color monitor.

5. An apparatus according to claim 1, wherein said color matching parameter is generated by combining the first characteristic data and the second characteristic data.

6. An apparatus according to claim 1, wherein the characteristic data of the first or second output device is a color reproducibility.

7. An apparatus according to claim 1, wherein the first and second characteristic data are received through a communication network.

8. An image processing method which outputs an image via a first output device in accordance with image information, the image being color processed such that the image is matched to an image outputted via a second output device in accordance with image information, said image processing method comprising the steps of:

inputting color image information, including color data, described in a predetermined language;

acquiring first characteristic data of the first output device and second characteristic data of the second output device from the first output device and the second output device;

generating a color matching parameter based on said first and second characteristic data;

performing color processing on the color data using the color matching parameter to provide processed color data;

developing the color image information into color image data for each pixel using the processed color data in accordance with control information for developing, included in the color image information described in the predetermined language; and outputting the color image data to the first output device.

* * * * *

UNITED STATES PATENT AND TRADEMARK OFFICE
CERTIFICATE OF CORRECTION

| | | |
|---|---|---|
| PATENT NO. | : 6,476,924 B1 | Page 1 of 2 |
| APPLICATION NO. | : 08/522456 | |
| DATED | : November 5, 2002 | |
| INVENTOR(S) | : Yukari Toda et al. | |

It is certified that error appears in the above-identified patent and that said Letters Patent is hereby corrected as shown below:

[76] INVENTORS - TITLE PAGE

"(76) Inventors: Yukari Toda, c/o Canon Kabushiki Kaisha, 30-2, Shimomaruko 3-chome, Ohta-ku, Tokyo (JP); Susumu Sugiura, c/o Canon Kabushiki Kaisha, 30-2, Shimomaruko 3-chome, Ohta-ku, Tokyo (JP); Kazuhiro Saito, c/o Canon Kabushiki Kaisha, 30-2, Shimomaruko 3-chome, Ohta-ku, Tokyo (JP)" should read
--(75) Inventors: Yukari Toda, Yokohama; Susumu Sugiura, Atsugi; Kazuhiro Saito, Yokohama; all of (JP)--.

[56] REFERENCES CITED - TITLE PAGE

U.S. Patent Documents
"12/1997 Starweather" should read --12/1997 Starkweather--.

COLUMN 7

Line 48, "indicating" should read --indicated--.

COLUMN 10

Line 42, "data!into" should read --data into--.

COLUMN 11

Line 58, "25" should be deleted.

UNITED STATES PATENT AND TRADEMARK OFFICE
CERTIFICATE OF CORRECTION

| | |
|---|---|
| PATENT NO. | : 6,476,924 B1 |
| APPLICATION NO. | : 08/522456 |
| DATED | : November 5, 2002 |
| INVENTOR(S) | : Yukari Toda et al. |

It is certified that error appears in the above-identified patent and that said Letters Patent is hereby corrected as shown below:

<u>COLUMN 16</u>

Line 28, "color'," should read --color,--.

Signed and Sealed this

Twenty-fourth Day of February, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 6,476,924 B1 |
| APPLICATION NO. | : 08/522456 |
| DATED | : November 5, 2002 |
| INVENTOR(S) | : Yukari Toda et al. |

It is certified that error appears in the above-identified patent and that said Letters Patent is hereby corrected as shown below:

Title Page

[73] ASSIGNEE

Insert: --(73) Assignee: Canon Kabushiki Kaisha, Tokyo (JP)--.

Signed and Sealed this

Nineteenth Day of May, 2009

JOHN DOLL
*Acting Director of the United States Patent and Trademark Office*